United States Patent [19]
Watanabe et al.

[11] Patent Number: 6,157,613
[45] Date of Patent: *Dec. 5, 2000

[54] CONGESTION CONTROL SYSTEM FOR CONTROLLING CONGESTION IN SWITCHING CELLS

[75] Inventors: Yoshihiro Watanabe; Satoshi Kakuma, both of Kanagawa, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/600,255

[22] Filed: Feb. 12, 1996

[30] Foreign Application Priority Data

Mar. 3, 1995 [JP] Japan .................................... 7-044077
Apr. 24, 1995 [JP] Japan .................................... 7-098788

[51] Int. Cl.[7] .................................................. H04L 12/56
[52] U.S. Cl. ............................................. 370/229; 370/395
[58] Field of Search .................................... 370/229, 230, 370/231, 232, 233, 235, 237, 389, 412–419, 444, 446, 236, 351, 352, 360, 395, 397, 396, 399, 471, 428, 429; 340/825.5, 825.51

[56] References Cited

U.S. PATENT DOCUMENTS

| | | | |
|---|---|---|---|
| 5,029,164 | 7/1991 | Goldstein et al. | 370/235 |
| 5,070,498 | 12/1991 | Kakuma et al. | 370/60 |
| 5,231,630 | 7/1993 | Ishibashi et al. | 370/60 |
| 5,231,633 | 7/1993 | Hluchyj et al. | 370/389 |
| 5,233,606 | 8/1993 | Pashan et al. | 340/825.5 |
| 5,255,266 | 10/1993 | Watanabe et al. | 370/60.1 |
| 5,287,535 | 2/1994 | Sakagawa et al. | 370/85.9 |
| 5,335,222 | 8/1994 | Kamoi et al. | 369/288 |
| 5,341,366 | 8/1994 | Soumiya et al. | 370/60 |
| 5,341,373 | 8/1994 | Ishibashi et al. | 370/85.9 |
| 5,809,012 | 9/1998 | Takase et al. | 370/229 |

FOREIGN PATENT DOCUMENTS

| | | |
|---|---|---|
| 1-272245 | 10/1989 | Japan . |
| 5235985 | 9/1993 | Japan . |
| 5244193 | 9/1993 | Japan . |
| 5304536 | 11/1993 | Japan . |
| 6188901 | 7/1994 | Japan . |
| 6216929 | 8/1994 | Japan . |

OTHER PUBLICATIONS

ITU–T Recommendations I.361 and I.371.

*Primary Examiner*—Dang Ton
*Attorney, Agent, or Firm*—Helfgott & Karas, PC.

[57] ABSTRACT

A congestion control system appropriately controls congestion of cells independently of the configuration of source and destination terminal units in, for example, an ATM switching unit, and shortens the time taken from the generation of congestion to the start of control. A buffer for switching the cells in a switch device adds to the cells transmitted through the switch device an EFCI for use in notifying the destination terminal unit of the congestion state of the cells. An output line device detects together with a VPI/VCI the EFCI added to the cell to be output from the switch device to the destination terminal unit. The output line device transmits to the switch device the VPI/VCI corresponding to the detected EFCI and an RM cell in which backward congestion indication is set.

39 Claims, 17 Drawing Sheets

PT FIELD AND CLP FIELD
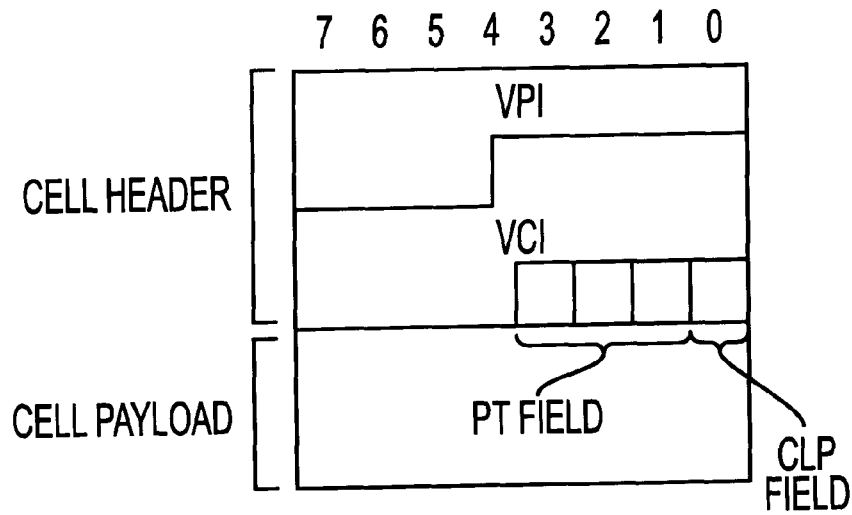
FIG. 3A
PTI
| PTI | MEANING |
|---|---|
| 000 001 | COMMON CELL |
| 010 011 | EFCI |
| 110 | RM CELL |
FIG. 3B
RM CELL
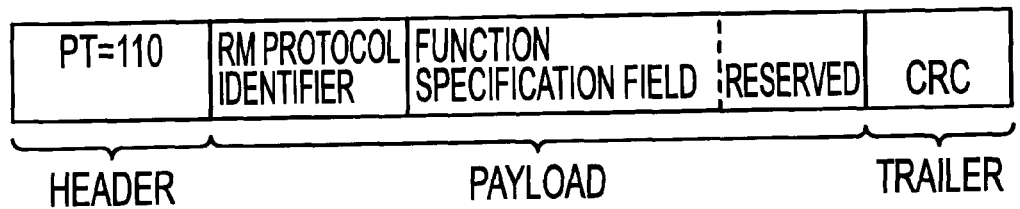
FIG. 3C

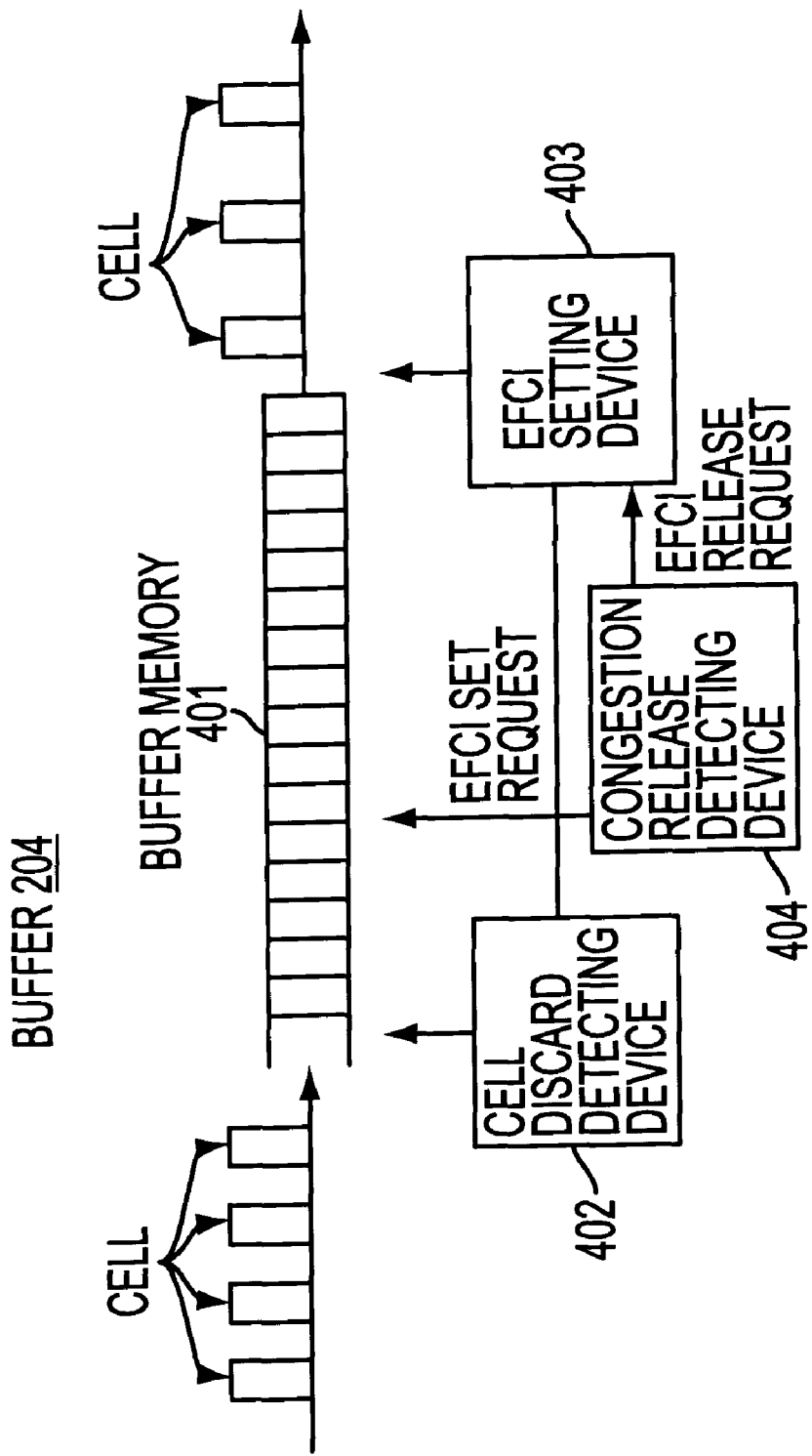

| 1 VALUE | PRIORITY IDENTIFIER |
|---|---|
| 000, 001 | 11 (UNIMPORTANT SUBSCRIBER) |
| 010, 011 | 01 (COMMON SUBSCRIBER) |
| 100, 101 | 00 (IMPORTANT SUBCRIBER) |

FIG. 14

CONGESTION CONTROL SYSTEM FOR CONTROLLING CONGESTION IN SWITCHING CELLS

BACKGROUND OF THE INVENTION

1. Field of the Invention

The present invention relates to the technology of preventing the congestion of cells in a cell-switching device of a synchronous transfer mode (ATM) switching device, etc.

2. Description of the Related Art

A large number of organizations have been studying ATM switching technology to realize the broadband integrated services digital network (ISDN) of the coming generation. In the ATM switching device, the contents of subscriber information (data, voice images, . . . ) are switched through a packet of a fixed length called a cell. As a result, the ATM system can transfer information at a high speed.

A calling acceptance judgment algorithm based on a band value declared by the user has been studied in order to make the most of the multiple effects of the utilization of the resources in the ATM switch.

The more the multiple effect is utilized, the more easily the cell congestion occurs in the network (switch). Therefore, an effective congestion preventing technology is required when a cell congestion occurs in operating the ATM switch.

According to the conventional technology for preventing congestion, a cell receiving terminal unit (destination terminal unit) is notified of the congestion, when the congestion is detected in the network, by setting the explicit forward congestion indication (EFCI) having the value of 101 or 011 is set in the 3-bit payload type (PT) field of the cell which has caused the congestion.

However, the above described prior art has the problem that the congestion cannot be properly controlled if the destination terminal unit does not have the function of detecting the EFCI, and that the terminal unit (source terminal unit) which has sent the congestion causing cell is not notified of the congestion.

Furthermore, the above described prior art has the problem that the congestion cannot be properly controlled if there is a long duration between the occurrence of the congestion and the start of the control because of the delay of cells in the transmission line and the delay of the processes performed in each terminal even if the destination and source terminals have functions mentioned above.

SUMMARY OF THE INVENTION

The present invention aims at realizing appropriate congestion control independent of the configurations of the source/destination terminal units, and realizing the reduction in the duration between the occurrence of the congestion and the start of the control.

The system according to the invention is a congestion control system for use in switching system for switching fixed length cells including a header for routing control and data. The system according to the invention comprises: first congestion detector for detecting first congestion information set in a cell to be sent to a destination terminal unit identified by a first routing control; and second congestion information transmitter for transmitting to a source terminal unit a cell having a second routing control associated with the first routing control and second congestion information for notifying the source terminal unit of the congestion state.

Another congestion control system according to the invention is for use in switching system for switching fixed length cells including a header for routing control and data, and comprises: a congestion detecting unit for detecting first congestion information which is set in a cell transmitted from a source terminal to a destination terminal and indicates a congestion state of a cell transmission; and a congestion information transmitting unit for transmitting toward the source terminal a second cell in which second congestion information for notifying the source terminal of the congestion state is set.

The congestion control system according to the invention may further comprise a first congestion setting unit for setting the first congestion information in the cell when the cell is a low-priority cell in which cell loss priority level information indicating that a priority level for a cell loss in a virtual communications line is low is set.

The congestion control system may further comprise a second congestion setting unit for setting the first congestion information in a high-priority cell in which cell loss priority level information indicating that the priority level for the cell loss in the virtual communications line is high is set.

The congestion control system may further comprise; a storing unit for storing virtual communications line information together with corresponding band information. In this system, the congestion detecting unit may detect virtual communications line information set in the cell; and the congestion information transmitting unit may transmit cells, in which virtual communications line information identical to virtual communications line information detected by said congestion detecting unit and stored in said storing unit are set, toward source terminals corresponding to the cells. The virtual communication line information set in the cells may be information of a predetermined number of pieces in the descending order of a band width indicated in band information corresponding to virtual communications line information stored in said storing unit.

The congestion control system may further comprise a storing unit for storing virtual communications line information, together with corresponding band information, of a predetermined number of pieces in the descending order of a band width in band indicated by the corresponding band information. In this system, the congestion detecting unit may detect virtual communications line information set in the cell; and the congestion information transmitting unit may transmit cells, in which virtual communications line information stored in said storing unit and identical to virtual communications line information detected by the congestion detecting unit are set, toward source terminals corresponding to the cells.

The congestion control system may further comprise a storing unit for storing virtual communications line information together with corresponding band information. In this system, the congestion detecting unit may detect virtual communications line information set in the cell; and the congestion information transmitting unit may transmit cells, in which virtual communications line information which is identical to the virtual communications line information detected by the congestion detecting unit, stored in the storing unit, and having the corresponding band information indicating a band equal to or larger than a predetermined value are set, toward source terminals corresponding to the cells.

The congestion control system may further comprise a storing unit for storing virtual communications line information having corresponding band information which indicate a band equal to or larger than a predetermined value. In this system, the congestion detecting unit may detect virtual communications line information set in the cell; and the congestion information transmitting unit may transmit cells, in which virtual communications line information stored in said storing unit and identical to the virtual communications line information detected by the congestion detecting unit are set, toward source terminals corresponding to the cells.

The congestion control system may further comprise; a congestion state detecting unit for determining congestion state relating to the cell by comparing a congestion threshold and subscriber priority level information which is set in the cell and indicate a priority level of a subscriber who communicates the cell; and a congestion information setting unit for setting the first congestion information in the cell according to the determination by the congestion state detecting unit.

The congestion control system may further comprise; a congestion state detecting unit for determining a congestion state relating to the cell by comparing a congestion threshold and cell-loss priority level information which is set in the cell and indicate a priority level for a cell-loss in a virtual communications line of the cell; and a congestion information setting unit for setting the first congestion information in the cell according to the determination by the congestion state detecting unit.

The congestion control system may further comprise a storing unit for storing, for each of the priority levels for cell communications of subscribers, virtual communications line information indicating virtual communications lines each corresponding to the subscribers and band information for the virtual communications lines. In this system, the congestion detecting unit may detect virtual communications line information and a priority level of a subscriber set in the cell; and the congestion information transmitting unit may transmit cells, in which virtual communications line information identical to virtual communications line information detected by the congestion detecting unit and stored in regions of the storing unit which correspond to priority levels detected by the congestion detecting unit are set, toward source terminals corresponding to the cells according to priority levels. The virtual communications line information set in the cells may be information of a predetermined number of pieces in the descending order of a band width indicated in band information corresponding to virtual communications line information stored in said storing unit.

The congestion control system may further comprise a storing unit for storing, for each priority level for cell communications of subscribers, virtual communications line information, together with corresponding band information, of a predetermined number of pieces in the descending order of a band width indicated by the corresponding band information. In this system, the congestion detecting unit may detect virtual communications line information and a priority level of a subscriber set in the cell; and the congestion information transmitting unit may transmit cells, in which virtual communications line information identical to virtual communications line information detected by the congestion detecting unit and stored in regions of said storing unit which correspond to priority levels detected by the congestion detecting unit are set, toward source terminals corresponding to the cells according to priority levels.

The congestion control system may further comprise a storing unit for storing, for each priority level for cell communications of subscribers, virtual communications line information indicating virtual communications lines each corresponding to the subscribers and band information for the virtual communications lines. In this system, the congestion detecting unit may detect virtual communications line information and the priority level of a subscriber set in the cell; and the congestion information transmitting unit may transmit cells, in which virtual communications line information identical to virtual communications line information detected by the congestion detecting unit and stored in regions of the storing unit which correspond to priority levels detected by the congestion detecting unit are set, toward source terminals corresponding to the cells according to priority levels, the virtual communications line information set in the cells which is information having corresponding band information indicating a band equal to or larger than a predetermined value.

The congestion control system may further comprise a storing unit for storing, for each priority level for cell communications of subscribers, virtual communications line information having the corresponding band information indicating a band equal to or larger than a predetermined value. In this system, the congestion detecting unit may detect virtual communications line information and the priority level of a subscriber set in the cell; and the congestion information transmitting unit may transmit cells, in which virtual communications line information identical to virtual communications line information detected by the congestion detecting unit and stored in regions of said storing unit which correspond to priority levels detected by the congestion detecting unit are set, toward source terminals corresponding to the cells according to priority levels.

The congestion control system may further comprise; a second congestion information detecting unit for receiving said second cell and detecting said second congestion information and virtual communications line information from the second cell; and a control unit for controlling an inflow of cells in a virtual communications line indicated by virtual communications line information detected by the second congestion information detecting unit according to second congestion information detected by the second congestion information detecting unit.

The second congestion information detecting unit may detect a number of second cells received in the predetermined duration; and the control unit may restrict at a predetermined rate the inflow of the cells in the virtual communications line when said second congestion information detecting unit detects the second cells of a number equal to or larger than a predetermined value in the predetermined duration.

The control unit may relax at a predetermined rate a restriction on the inflow of the cells in the virtual communications line when said second congestion information detecting unit detects the second cells of a number smaller than a predetermined value in the predetermined unit time.

Another congestion control system according to the invention is for use in switching system for switching fixed length cells including a header for routing control and data, and comprises; a congestion detecting unit for detecting congestion in a cell communications line and outputting first congestion information indicating the congestion; and a congestion information transmitting unit for detecting the first congestion information output by the congestion detecting unit and transmitting a cell, in which second congestion information indicating the congestion is set, toward a source terminal of a cell communicated in the cell communications line.

The congestion control system may further comprise a control unit for receiving a cell having the second congestion information and controlling a cell inflow of the cell communications line.

A congestion control method according to the invention is for use in a switching system for switching fixed length cells including a header for routing control and data, and includes the steps of: detecting first congestion information set in a cell to be sent to a destination terminal unit identified by a first routing control; and transmitting to a source terminal unit a cell having a second routing control associated with the first routing control and second congestion information for notifying the source terminal unit of the congestion state.

Another congestion control method according to the invention is for use in switching system for switching fixed length cells including a header for routing control and data, and includes: a first step of detecting first congestion information which is set in a cell transmitting from a source terminal to a destination terminal and indicates a congestion state of a cell transmission; and a second step of transmitting toward the source terminal a second cell in which second congestion information for notifying the source terminal of the congestion state is set.

The congestion control method may further include a step of setting the first congestion information into the cell when the cell is a low-priority cell in which cell loss priority level information indicating that a priority level for a cell loss in a virtual communications line is low is set.

The congestion control method may further include a step of setting the first congestion information into a high-priority cell in which cell loss priority level information indicating that the priority level for the cell loss in the virtual communications line is high is set.

The congestion control method may further include steps of storing virtual communications line information together with corresponding band information in a storing unit, and detecting virtual communications line information set in the cell. In the second step, cells, in which virtual communications line information identical to the detected virtual communications line information and stored in said storing unit are set, may be transmitted toward source terminals corresponding to the cells. The virtual communications line information set in the cells may be information of a predetermined number of pieces in the descending order of a band width indicated in band information corresponding to virtual communications line information stored in said storing unit.

The congestion control method may further include steps of storing virtual communications line information, together with corresponding band information, of a predetermined number of pieces in the descending order of a band width indicated in band indicated by the corresponding band information in a storing unit, and detecting virtual communications line information set in the cell. In the second step, cells, in which virtual communications line information stored in said storing unit and identical to the detected virtual communications line information are set, may be transmitted toward source terminals corresponding to the cells.

The congestion control method may further include steps of storing virtual communications line information together with corresponding band information in a storing unit, and detecting virtual communications line information set in the cell. In the second step, cells, in which virtual communications line information which is identical to the detected virtual communications line information, stored in the storing unit, and having the corresponding band information indicating a band equal to or larger than a predetermined value are set, may be transmitted toward source terminals corresponding to the cells.

The congestion control method may further include steps of storing virtual communications line information having corresponding band information which indicate a band equal to or larger than a predetermined value in a storing unit; and detecting virtual communications line information set in the cell. In the second step, cells, in which virtual communications line information stored in said storing unit and identical to the detected virtual communications line information are set, may be transmitted toward source terminals corresponding to the cells.

The congestion control method may further include a third step of determining the congestion state relating to the cell by comparing a congestion threshold and subscriber priority level information which is set in the cell and indicate a priority level of a subscriber who communicates the cell, and a fourth step of setting the first piece of congestion information into the cell according to the determination in the third step.

The congestion control method may further include a third step of determining congestion state relating to the cell by comparing a congestion threshold and cell-loss priority level information which is set in the cell and indicate a priority level for a cell-loss in a virtual communications line of the cell and a fourth step of setting the first piece of congestion information into the cell according to the determination in the third step.

The congestion control method may further include steps of storing, for each priority level for cell communications of subscribers, virtual communications line information indicating virtual communications lines each corresponding to the subscribers and band information for the virtual communications lines in a storing unit, and detecting virtual communications line information and the priority level of a subscriber set in the cell. In the second step, cells, in which virtual communications line information identical to the detected virtual communications line information and stored in regions of the storing unit which correspond to the detected priority levels are set, may be transmitted toward source terminals corresponding to the cells according to priority levels. The virtual communications line information set in the cells may be information of a predetermined number of pieces in the descending order of a band width indicated in band information corresponding to virtual communications line information stored in said storing unit.

The congestion control method may further include steps of storing, for each of the priority levels for cell communications of subscribers, virtual communications line information, together with corresponding band information, of a predetermined number of pieces in the descending order of a band width in band indicated by the corresponding band information in a storing unit, and detecting virtual communications line information and the priority level of a subscriber set in the cell. In the second step, cells, in which virtual communications line information identical to the detected virtual communications line information and stored in regions of said storing unit which correspond to the detected priority levels are set, may be transmitted toward source terminals corresponding to the cells according to priority levels.

The congestion control method may further include the steps of storing for each priority level for cell communications of subscribers, virtual communications line information indicating virtual communications lines each corresponding to the subscribers and band information for the virtual communications lines in a storing unit, and detecting virtual communications line information and the priority level of a subscriber set in the cell. In the second step, cells, in which virtual communications line information identical to the detected virtual communications line information and stored in regions of the storing unit which correspond to the detected priority levels are set, may be transmitted toward source terminals corresponding to the cells according to priority levels. The virtual communications line information set in the cells may be information having corresponding band information indicating a band equal to or larger than a predetermined value.

The congestion control method may further include the steps of storing, for each priority level for cell communications of subscribers, virtual communications line information having the corresponding band information indicating a band equal to or larger than a predetermined value in a storing unit, and detecting virtual communications line information and the priority level of a subscriber set in the cell. In the second step, cells, in which virtual communications line information identical to the detected virtual communications line information and stored in regions of said storing unit which correspond to the detected priority levels are set, may be transmitted toward source terminals corresponding to the cells according to priority levels.

The congestion control method may further include a third step of receiving said second cell and detecting said second congestion information and virtual communications line information from the second cell, and a fourth step of controlling an inflow of cells in a virtual communications line indicated by virtual communications line information detected in the third step according to second congestion information detected in the third step.

The number of second cells received in a predetermined duration may be detected in the third step. In the fourth step, the inflow of the cells in the virtual communications line may be restricted at a predetermined rate when the number of the second cells equal to or larger than a predetermined value are detected in the predetermined duration in the third step.

In the fourth step, a restriction on the inflow of the cells in the virtual communications line may be relaxed at a predetermined rate when the number of the second cells smaller than a predetermined value are detected in the predetermined duration in the third step.

Another congestion control method according to the invention is for use in a switching system for switching fixed length cells including a header for routing control and data. The method includes a first step of detecting a congestion in a cell communications line and outputting first congestion information indicating the congestions, and a second step of detecting the first congestion information output in the first step and transmitting a cell, in which second congestion information indicating the congestion is set, toward a source terminal of a cell communicated in the cell communications line.

The congestion control method may further include a step of receiving a cell having the second congestion information and controlling a cell inflow of the cell communications line.

FIG. 1 shows the configuration of the system to which the present invention is applied.

A cell input from a source terminal unit to an input line device 101 is then input to a switch device 102 for switching a cell which is a data unit in transferring communications information based on, for example, an ATM switching technology.

This cell is switched in the switch device 102 and output to an output line device 103 corresponding to an output line through which the cell is output.

The cell output from the output line device 103 to the output line is transmitted to a destination terminal unit to which the output line is connected.

A switching portion 104 (for example, a buffer 204 shown in FIG. 2) for switching cells in the switch device 102 sets, in a cell transmitted through the portion, first congestion information (for example, an explicit forward congestion indication EFCI) for use in notifying a destination terminal unit of a cell congestion state.

Described below is each aspect of the present invention based on the above described configuration.

First described is the configuration according to the first aspect of the present invention. The configuration according to the first aspect corresponds to the configuration in, for example, the output line device 103 shown in FIG. 1 and includes a first congestion information detecting unit and a first congestion information setting cell transmitting unit.

The first congestion information detecting unit (for example, a EFCI detecting device 501 shown in FIG. 5) detects first congestion information and the virtual communications line information (for example, VPI/VCI). The first congestion information is set in a cell output from the switch device 102 to a destination terminal unit for use in notifying a destination terminal unit of the congestion state in the switch device 102. The virtual communications line information is also set in the cell.

A second congestion information setting cell transmitting unit (for example, an RM cell generating device 502 shown in FIG. 5) transmits to the switch device 102 a cell (RM cell) in which the virtual communications transmission line information detected corresponding to the detected first congestion information and second congestion information (backward congestion indication) for use in notifying the source terminal unit of the congestion state in the switch device 102 are set.

Described below is a configuration according to the second aspect of the present invention. The configuration refers to that of the switching portion 104 in the switch device 102 shown in FIG. 1 and includes a congestion state detecting unit and a low-priority-level cell first congestion information setting unit.

The second aspect of the present invention is applied to the system, as in the first aspect of the present invention, having the function of sending from, for example, the output line device 103 to the source terminal unit a cell in which the second congestion information is set.

The congestion state detecting unit (for example, a cell discard detecting device 402 and a congestion release detecting device 404 shown in FIG. 4) detects the congestion state in the switching portion 104 in the switch device 102.

The low-priority-level cell first congestion information setting unit (for example, a low-priority-level cell EFCI setting device 601 shown in FIG. 6) sets, according to the congestion state detected by the congestion state detecting unit, the first congestion information for use in notifying the destination terminal unit of the congestion state, in a low-priority-level cell in which the cell loss priority level information (for example, CLP) is set.

The cell loss priority level information indicates that the cell, of the cells transmitted through the switching portion 104, has a low cell loss priority level in the virtual communications line (for example, having the same VPI/VCI).

Described below is a configuration according to the third aspect of the present invention. The configuration according to the third aspect of the present invention also relates to that of the switching portion 104 in the switch device 102 shown in FIG. 1, and includes a congestion retention time monitor unit and a high-priority-level cell first congestion information setting unit in addition to the configuration according to the second aspect of the present invention.

The congestion retention time monitor unit (for example, congestion retention time monitor device 701 shown in FIG. 7) monitors the retention time of the congestion state to which the first congestion information is assigned by the first congestion information setting unit for the low-priority-level cell.

The high-priority-level cell first congestion information setting unit (for example, an EFCI setting device 701 shown in FIG. 7) sets, according to the monitor state of the retention time of the congestion state detected by the congestion retention time monitor unit, the first congestion information in a high-priority-level cell in which the cell loss priority level information (for example, CLP) is set. The cell loss priority level information indicates that the cell, of the cells transmitted through the switching portion 104, has a high cell loss priority level in the virtual communications line.

Described below is a configuration according to the fourth aspect of the present invention. The configuration according to the fourth aspect relates to the output line device 103 shown in FIG. 1, and includes a virtual communications line information/band information storage unit, a first congestion information detecting unit and a second congestion information setting cell transmitting unit.

The virtual communications line information/band information storage unit (for example, a call processor 802, a backward congestion indication object VPI/VCI setting device 803, and backward congestion indication object VPI/VCI storage device 804 shown in FIG. 8) stores band information relating to the virtual communications line information for each piece of virtual communications line information.

The first congestion information detecting unit is the same as that according to the first aspect of the present invention.

The second congestion information setting cell transmitting unit (for example, a RM cell generating device 801 shown in FIG. 8) transmits to the switch device 102 a cell in which virtual communications line information and the second congestion information are set. The virtual communications line information is detected corresponding to the detected first congestion information and is set in units of a predetermined number in the descending order of a band width indicated in band information stored in the virtual communications line information/band information storage unit. The second congestion information is used in notifying the source terminal unit of the congestion state in the switch device 102.

Described below is a configuration according to the fifth aspect of the present invention. The configuration according to the fifth aspect relates to that in the output line device 103 shown in FIG. 1, and includes a virtual communications line information/band information storage unit, a first congestion information detecting unit, and second congestion information setting cell transmitting unit.

The virtual communications line information/band information storage unit is the same as that according to the fourth aspect of the present invention.

The first congestion information detecting unit is the same as that according to the first aspect of the present invention.

The second congestion information setting cell transmitting unit (for example, a RM cell generating device 801 shown in FIG. 8) transmits to the switch device 102 a cell in which virtual communications line information and the second congestion information are set. The virtual communications line information is detected corresponding to the detected first congestion information and is set when the band information stored in the virtual communications line information/band information storage unit indicates a value equal to or larger than a predetermined band. The second congestion information is used in notifying the source terminal unit of the congestion state in the switch device 102.

Described below is a configuration according to the sixth aspect of the present invention. The configuration according to the sixth aspect relates to that in the output line device 103 shown in FIG. 1, and includes a virtual communications line information storage unit, a first congestion information detecting unit, and second congestion information setting cell transmitting unit. The virtual communications line information storage unit (for example, a call processor 802, a backward congestion indication object VPI/VCI setting device 803, and backward congestion indication object VPI/VCI storage device 804, and backward congestion indication object VPI/VCI storage device 804 shown in FIG. 8) stores the virtual communications line information of a predetermined number of pieces in the descending order of a band width indicated in band information at each point.

The first congestion information detecting unit is the same as that according to the first aspect of the present invention.

The second congestion information setting cell transmitting unit (for example, a RM cell generating device 801 shown in FIG. 8) transmits to the switch device 102 a cell in which virtual communications line information and the second congestion information are set. The virtual communications line information is detected corresponding to the detected first congestion information and stored in the virtual communications line information storage unit. The second congestion information is used in notifying the source terminal unit of the congestion state in the switch device 102.

Described below is a configuration according to the seventh aspect of the present invention. The configuration according to the seventh aspect relates to that in the output line device 103 shown in FIG. 1, and includes a virtual communications line information storage unit, a first congestion information electing unit and second congestion information setting cell transmitting unit. The virtual communications line information storage unit (for example, a call processor 802, a backward congestion indication object VPI/VCI setting device 803, and backward congestion indication object VPI/VCI storage device 804 shown in FIG. 8) stores the virtual communications line information indicating band information equal to or larger than a predetermined band at each point.

The first congestion information detecting unit is the same as that according to the first aspect of the present invention.

The second congestion information setting cell transmitting unit is the same as that according to the sixth aspect of the present invention.

Described below is a configuration according to the eighth aspect of the present invention. The configuration according to the eighth aspect relates to that of switching portion 104 in the switch device 102 shown in FIG. 1, and includes a congestion state detecting unit and a first congestion information setting unit. According to the eighth aspect of the present invention, the system has the function of transmitting to a source terminal unit a cell in which the second congestion information is set in, for example, the output line device 103 as in the first aspect of the present invention.

The congestion state detecting unit (for example, a cell discard detecting device 1102 and a congestion release detecting device 1104 shown in FIG. 11) detects, in the switching portion 104 in the switch device 102, the congestion state according to the congestion threshold initially set for each piece of subscriber priority level information (priority identifier) indicating the priority level of a subscriber communicating cells which are transmitted through the switch and for which the priority level is set.

The first congestion information setting unit (for example, EFCI/congestion threshold identifier setting device 1103 shown in FIG. 11) sets the first congestion information for use in notifying a destination terminal unit of the congestion state according to the congestion state detected by the congestion state detecting unit. The information is set for the cell in which the subscriber priority level information is set corresponding to the congestion threshold of the congestion state of the cells transmitted through the switching portion 104.

Described below is a configuration according to the ninth aspect of the present invention. The configuration according to the ninth aspect relates to that of switching portion 104 in the switch device 102 shown in FIG. 1 and includes a congestion state detecting unit and a first congestion information setting unit. The configuration of the system according to the ninth aspect of the present invention is the same as that according to the eighth aspect.

The congestion state detecting unit (for example, a cell discard detecting device 1102 and a congestion release detecting device 1104 shown in FIG. 11) detects, in the switching portion 104 in the switch device 102, the congestion state according to the congestion threshold initially set for each piece of subscriber priority level information (priority identifier) indicating the priority level of a subscriber communicating cells which are transmitted through the switch and in which the priority level is set, and for each piece of cell loss priority level information (CLP) indicating the priority level of the cells, which are transmitted in the switch and store the priority levels, in a virtual communications line.

The first congestion information setting unit (for example, EFCI/congestion threshold identifier setting device 1103 shown in FIG. 11) sets the first congestion information for use in notifying a destination terminal unit of the congestion state according to the congestion state detected by the congestion state detecting unit. The information is set for the cell in which the subscriber priority level information and the cell loss priority level information are set corresponding to the congestion threshold of the congestion state of the cells transmitted through the switching portion 104.

Described below is a configuration according to the tenth aspect of the present invention. The configuration according to the tenth aspect relates to that in the output line device 103 shown in FIG. 1, and includes a virtual communications line information/band information storage unit, a first congestion information detecting unit and a second congestion information setting cell transmitting unit.

The virtual communications line information/band information storage unit (for example, a call processor 1203, a backward congestion indication object VPI/VCI setting device 1204, and backward congestion indication object VPI/VCI storage device 1205 shown in FIG. 12) stores, for each piece of subscriber priority level information (priority identifier) indicating the priority level of a subscriber communicating cells, the virtual communications line information about the subscriber assigned to the subscriber priority level and the band information about the virtual communications line information.

The first congestion information detecting unit (for example, EFCI/congestion threshold identifier detecting device 1201 shown in FIG. 12) detects the first congestion information set in the cell output from the switch device 102 to the destination terminal unit together with the virtual communications line information (for example, VPI/VCI) and the subscriber priority level information (for example, a congestion threshold identifier) set in the cell.

The second congestion information setting cell transmitting unit (for example, an RM cell generating device 1202 shown in FIG. 12) transmits to the switch device 102 a cell in which virtual communications line information and the second congestion information are set. The virtual communications line information is detected corresponding to the detected first congestion information and is set in a predetermined number of units in the descending order of a band width indicated in band information stored in the storage area for the information about the subscriber priority level detected corresponding to the first congestion information in the virtual communications line information/band information storage unit. The second congestion information is used in notifying the source terminal unit of the congestion state in the switch device 102.

Described below is a configuration according to the $11^{th}$ aspect of the present invention. The configuration according to the $11^{th}$ aspect relates to that in the output line device 103 shown in FIG. 1, and includes a virtual communications line information/band information storage unit, a first congestion information detecting unit, and a second congestion information setting cell transmitting unit.

The virtual communications line information/band information storage unit and the first congestion information detecting unit and the first congestion information detecting unit are the same as those according to the $10^{th}$ aspect of the present invention.

The second congestion information setting cell transmitting unit (for example, an RM cell generating device 1202 shown in FIG. 12) transmits to the switch device 102 a cell in which virtual communications line information and the second congestion information are set. The virtual communications line information is detected corresponding to the detected first congestion information and indicates band information equal to or larger than a predetermined band value stored in the storage area corresponding to the information about the subscriber priority level detected corresponding to the first congestion information in the virtual communications line information/band information storage unit. The second congestion information is used in notifying the source terminal unit of the congestion state in the switch device 102.

Described below is a configuration according to the $12^{th}$ aspect of the present invention. The configuration according to the $12^{th}$ aspect relates to that in the output line device 103 shown in FIG. 1, and includes a virtual communications line information storage unit, a first congestion information detecting unit, and a second congestion information setting cell transmitting unit. The virtual communications line information storage unit (for example, a call processor 1203, a backward congestion indication object VPI/VCI setting device 1204, and backward congestion indication object VPI/VCI storage device 1205 shown in FIG. 12) stores the virtual communications line information of a predetermined number of pieces in the descending order of a band width indicated in band information at each point corresponding to the subscriber assigned the subscriber priority level for each piece of subscriber priority level information indicating the priority level of the subscriber communicating cells.

The first congestion information detecting unit is the same as that according to the 10$^{th}$ aspect of the present invention.

The second congestion information setting cell transmitting unit (for example, an RM cell generating device 1202 shown in FIG. 12) transmits to the switch device 102 a cell in which virtual communications line information and the second congestion information are set. The virtual communications line information is detected corresponding to the detected first congestion information and stored in the storage area corresponding to the information about the subscriber priority level detected corresponding to the first congestion information in the virtual communications line information storage unit. The second congestion information is used in notifying the source terminal unit of the congestion state in the switch device 102.

Described below is a configuration according to the 13$^{th}$ aspect of the present invention. The configuration according to the 13$^{th}$ aspect relates to that in the output line device 103 shown in FIG. 1, and includes a virtual communications line information storage unit, a first congestion information detecting unit, and a second congestion information setting cell transmitting unit. The virtual communications line information storage unit (for example, a call processor 1203, a backward congestion indication object VPI/VCI setting device 1204, and a backward congestion indication object VPI/VCI storage device 1205 shown in FIG. 12) stores the virtual communications line information having band information equal to or larger than a predetermined value at each point corresponding to the subscriber assigned the subscriber priority level for each piece of subscriber priority level information indicating the priority level of the subscriber communicating cells.

The first congestion information detecting unit is the same as that according to the 10$^{th}$ aspect of the present invention.

The second congestion information setting cell transmitting unit is the same as that according to the 12$^{th}$ aspect of the present invention.

Described below is a configuration according to the 14$^{th}$ aspect of the present invention. The configuration according to the 14$^{th}$ aspect relates to that in, for example, the input line device 101 shown in FIG. 1 and includes a second congestion information detecting unit and a cell inflow control unit.

The second congestion information detecting unit (for example, a backward congestion indication detecting device 1501 shown in FIG. 15) detects the second congestion information (for example, backward congestion indication) set in a cell output from the switch device 102 to a source terminal unit for use in notifying the source terminal unit of the congestion state in the switch device 102. The information is detected together with the virtual communications line information (for example, VPI/VCI) set in the cell.

The cell inflow control unit (for example, a restriction rate storage device 1502, a UPC data storage device 1503, and a UPC control device 1504 shown in FIG. 15) controls the inflow of the cells in which the virtual communications line information detected corresponding to the first congestion information is set in the cells input from the source terminal unit to the switch device 102.

Described below is a configuration according to the 15$^{th}$ aspect of the present invention. The configuration according to the 15$^{th}$ aspect of the present invention relates to the configuration of, for example, the input line device 101 shown in FIG. 1, and includes a cell number detecting unit in addition to the above described configuration according to the 14$^{th}$ aspect of the present invention.

The cell number detecting unit (for example, the backward congestion indication detecting device 1501 in FIG. 15) detects the number of cells in which the second congestion information detected by the second congestion information detecting unit in a predetermined time unit is set, for each piece of virtual communications line information.

The cell control unit restricts at a predetermined rate the inflow of the cells in which, information identical to the virtual communications line information set in cells detected by the cell number detecting unit when the cell number detecting unit detects cells of a number equal to or larger than a predetermined value in a predetermined time, is set.

Described below is the configuration according to the 16$^{th}$ aspect of the present invention. The configuration according to the 16$^{th}$ aspect of the present invention relates to the configuration according to the 14$^{th}$ or 15$^{th}$ aspect of the present invention, and practically to, for example, the input line device 101 shown in FIG. 1.

According to the 16$^{th}$ aspect of the present invention, the cell inflow control unit relaxes at a predetermined rate a restriction on the inflow of the cells in which, information identical to the virtual communications line information which is set in a cell detected by the cell number detecting unit when the cell number detecting unit detects cells of a number smaller than a predetermined value in the predetermined duration for predetermined times, is set.

Described below is the configuration according to the 17$^{th}$ aspect of the present invention. The configuration according to the 17$^{th}$ aspect relates to that in the output line device 103 shown in FIG. 1, and includes a congestion state detecting unit, a first congestion information setting unit, and a second congestion information setting cell transmitting unit.

The congestion state detecting unit (for example, an output line device 203 shown in FIG. 17) corresponds to the output line and detects through a predetermined control path the congestion state in the switching portion 104 in the switch device 102 for switching cells which are data units in transferring communications information.

According to the congestion state detected by the congestion state detecting unit, the first congestion information setting unit (for example, output line device 203) sets in the cell to be output to the output line the first congestion information for use in providing the congestion state information for the destination terminal unit connected to the output line.

The second congestion information setting cell transmitting unit (for example, the output line device 203 shown in FIG. 17) transmits to the switch device 102 the cell in which the second congestion information is set to notify the source terminal unit of the congestion state detected by the congestion state detecting unit.

According to the first aspect of the present invention, even if a destination terminal unit does not have the functions of detecting the first congestion information (EFCI) and transmitting the cell in which the second congestion information (backward congestion indication) is set, the output line device 103 can automatically transmit the cell in which the second congestion information is set to the switch device 102, thereby realizing effective congestion control.

The second aspect of the present invention realizes appropriate congestion control by, for example, restricting the traffic of the cell in the descending order of a priority level.

According to the third aspect of the present invention, the congestion control can be performed appropriately by restricting higher order priority level cells when the congestion cannot be prevented only by restricting the traffic of lower priority level cells.

According to the fourth aspect of the present invention, the congestion can be effectively prevented by transmitting to the switch device 102 the cell in which the second congestion information is set in the descending order of the largest request band width or an available band width for the virtual communications line.

According to the fifth aspect of the present invention, the congestion can be quickly and effectively prevented quickly by transmitting to the switch device 102 the cell in which the second congestion information is set in order from the virtual communications line having a value of band equal to or larger than a predetermined value of the request band or available band.

According to the sixth aspect of the present invention based on the fourth aspect, the virtual communications line information can be quickly retrieved, when the cell in which the second congestion information is set is transmitted, by storing the virtual communications line information in the descending order of a request band width or an available band width.

According to the seventh aspect of the present invention based on the fifth aspect, the virtual communications line information can be quickly retrieved, when the cell in which the second congestion information is set is transmitted, by storing the virtual communications line information having a band of a value equal to or larger than a predetermined value of the request band or available band.

According to the eighth aspect of the present invention, the congestion control can be appropriately performed depending on the priority level of each subscriber by assigning different congestion thresholds to subscriber priority levels and by setting the first congestion information in a congestion-causing cell in which the subscriber priority level information is set corresponding to the congestion threshold.

According to the ninth aspect of the present invention, congestion control can be appropriately performed depending of the priority level of each subscriber and cell loss priority level by assigning different congestion thresholds to subscriber priority levels and cell loss priority levels and by setting the first congestion information in a congestion causing cell in which the subscriber priority level information and cell loss priority level information are set corresponding to the congestion threshold.

According to the $10^{th}$ aspect of the present invention based on the fourth aspect, control can be performed depending on the subscriber priority level corresponding to the subscriber priority level information stored in the cell in which the EFCI is set.

According to the $11^{th}$ aspect of the present invention based on the fifth aspect, control can be performed depending on the subscriber priority level corresponding to the subscriber priority level information stored in the cell in which the EFCI is set.

According to the $12^{th}$ aspect of the present invention based on the $6^{th}$ aspect, control can be performed depending on the subscriber priority level corresponding to the subscriber priority level information stored in the cell in which the EFCI is set.

According to the $13^{th}$ aspect of the present invention based on the $7^{th}$ aspect, control can be performed depending on the subscriber priority level corresponding to the subscriber priority level information stored in the cell in which the EFCI is set.

According to the $14^{th}$ aspect of the present invention, the inflow of cells input from the source terminal unit to the switch device 102 can be controlled at the entrance of the switch device 102 according to the second congestion information set in the cell output from the switch device 102 to the source terminal unit, even if the source terminal unit does not have the function of controlling the transmission of cells according to information set in the cell.

According to the $15^{th}$ and $16^{th}$ aspects of the present invention based on the $14^{th}$ aspect, exact congestion control can be realized depending on the traffic in the switch device 102 by counting the number of cells in each time unit in which the second congestion information is detected and then changing, step by step, the rate of inflow of cells.

According to the $17^{th}$ aspect of the present invention, the switch device 102 can be simple in design because the switching portion 104 of the switch device 102 requires no mechanism of setting an EFCI.

BRIEF DESCRIPTION OF THE DRAWINGS

FIGS. 3A to 3C show the format of the PT field, CLP field, and RM field;

FIG. 4 shows the configuration (1) of the buffer 204;

FIG. 14 shows the relationship between the congestion threshold identifier and priority identifier;

DESCRIPTION OF THE PREFERRED EMBODIMENTS

The embodiments of the present invention are described below in detail by referring to the attached drawings.

Figure 1:
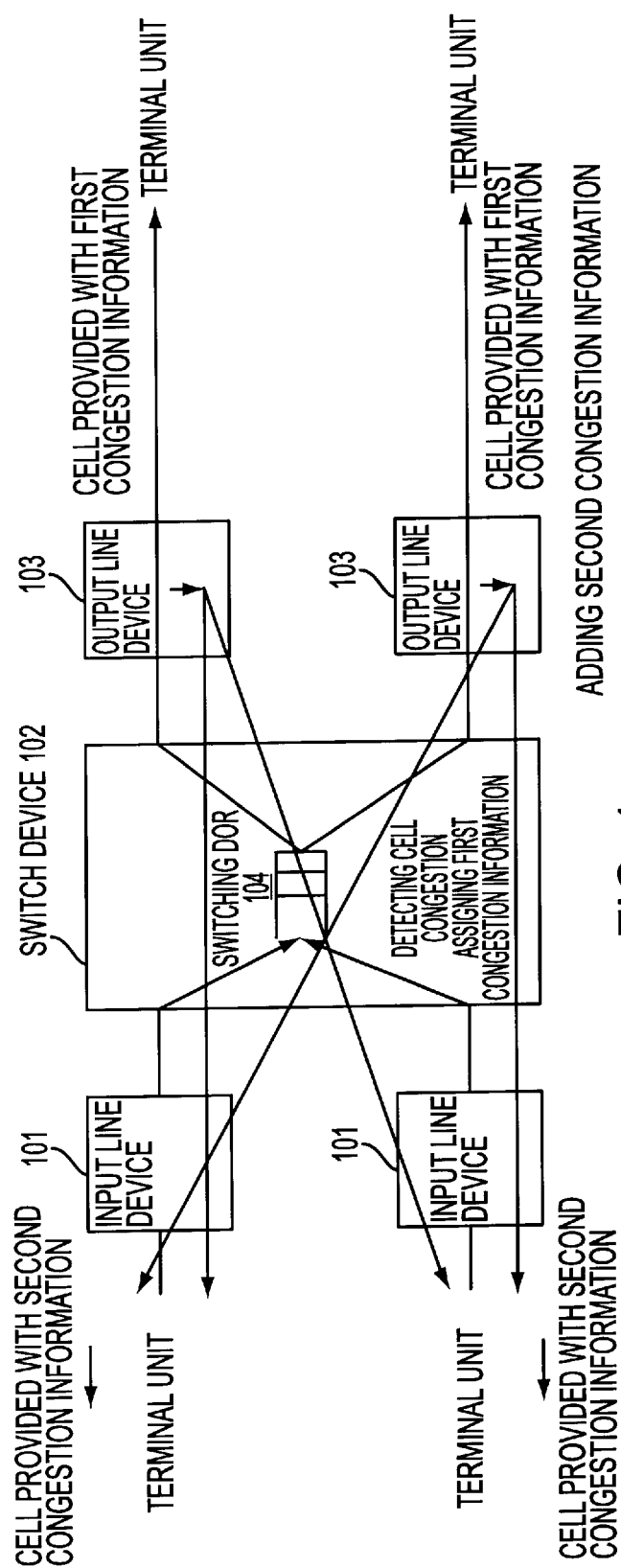
FIG. 1 shows the configuration of the basic system according to the present invention.
Figure 2:
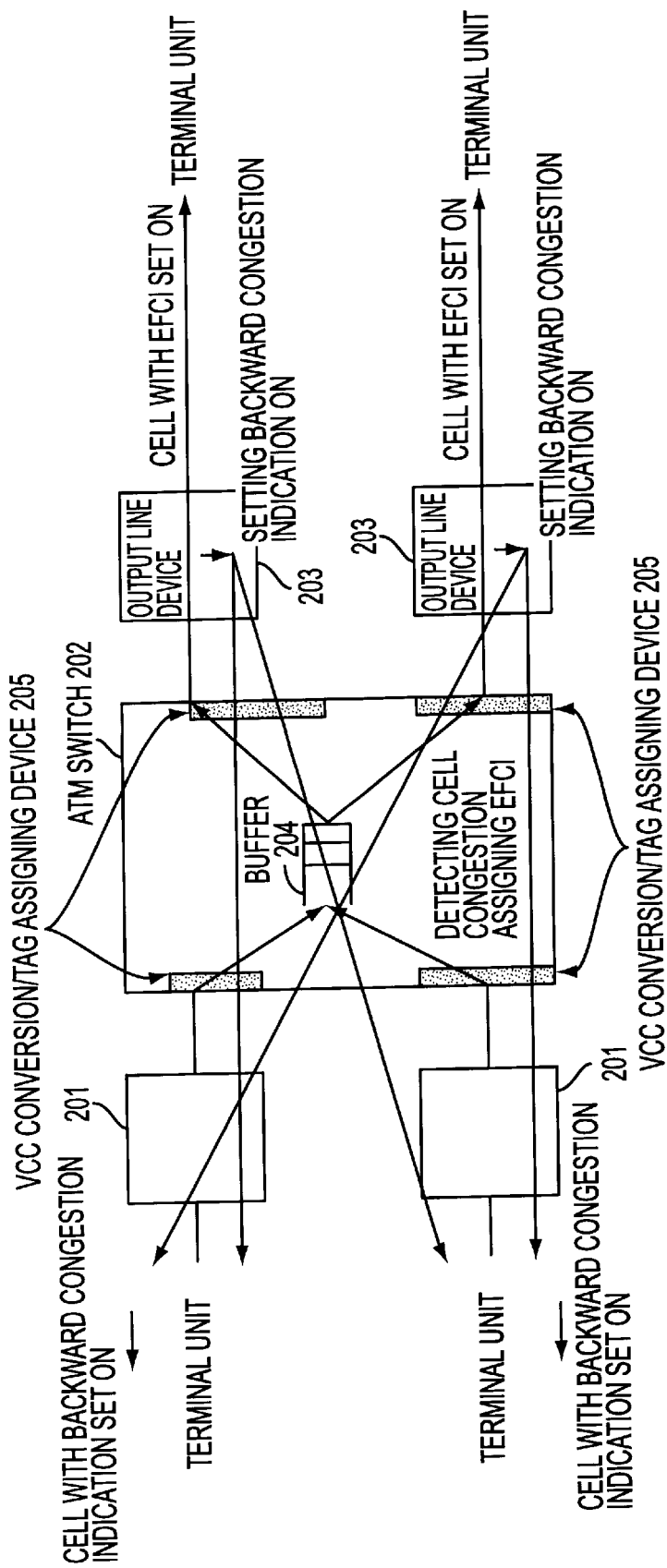
FIG. 2 shows the basic configuration according to an embodiment of the present invention.

FIG. 2 shows the basic configuration according to the present invention.

A cell input from a source terminal unit to an input line device 201 is transmitted to a VCC conversion/tag assigning device 205 in an ATM switch 202.

The VCC conversion/tag assigning device 205 renumbers the values of the virtual path identifier (VPI) and virtual channel identifier (VCI) stored in the header field of the input cell with values corresponding to the output line. Then, it adds the routing information referred to as tag information to the head of the cell to allow the cell to be autonomously switched in the ATM switch 202.

The cell output from the VCC conversion/tag assigning device 205 is autonomously switched in the ATM switch 202 according to the tag information added to its head, and is output to the output line device 203 corresponding to the output line through which the cell is to be output.

The cell output from the output line device 203 to the output line is received by a destination terminal unit connected to the output line.

When the buffer 204 for switching cells in the ATM switch 202 detects the congestion of cells, it sets an explicit forward congestion indication (EFCI) in the PT field of the header of the cell which has caused the congestion.

FIG. 3A shows the position of the PT field in a cell. FIG. 3B shows each value (payload type identification (PTI)) set in the PT field and the meaning of each value. FIG. 3C shows the configuration of the RM cell. As shown in these figures, the EFCI is specified as a value (010 or 011) set in the PT field.

When the output line device 203 receives a cell in which the EFCI is set, it immediately outputs the cell to the output line. As a result, the destination terminal unit which receives the cell is notified of the occurrence of the congestion. Simultaneously, the output line device 203 generates an RM cell (refer to FIG. 3C) in which the header field stores the same VPI/VCI (refer to FIG. 2) as the header field of the cell which is received from the ATM switch 202 and in which the EFCI is set and in which the PT field in the header field has the value of 110 (refer to FIG. 3B) indicating a resource management (RM) cell and in which the backward congestion indication is set in the payload. Then, the output line device 203 transmits the RM cell to the ATM switch 202. According to the cell, the source terminal unit is notified of the occurrence of the congestion from the ATM switch 202 through the input line. As a result, the source terminal unit prevents the congestion by restricting cell transmissions.

Described below are embodiments of the present invention based on the above described configuration.

Explained first is the first embodiment of the present invention.

FIG. 4 shows the configuration of the buffer 204 shown in FIG. 2 according to the first embodiment of the present invention.

A buffer memory 401 temporarily holds a cell to be switched later.

The cell discard detecting device 402 compares the number of retaining cells in the buffer memory 401 with a predetermined threshold, determines the timing for starting the discard of cells, and issues a request to set an EFCI to an EFCI setting device 403 upon determination of the timing.

Upon receipt of the request to set the EFCI, the EFCI setting device 403 sets the EFCI in the PT fields of the headers of all cells output from the buffer memory 401.

The congestion release detecting device 404 compares the amount of retaining cells in the buffer memory 401 with a predetermined threshold, determines the timing for releasing the congestion, and issues a request to release an EFCI to an EFCI setting device 403 upon determination of the timing.

Upon receipt of the request to release the EFCI, the EFCI setting device 403 stops setting the EFCI in the cell output from the buffer memory 401.

Figure 5:
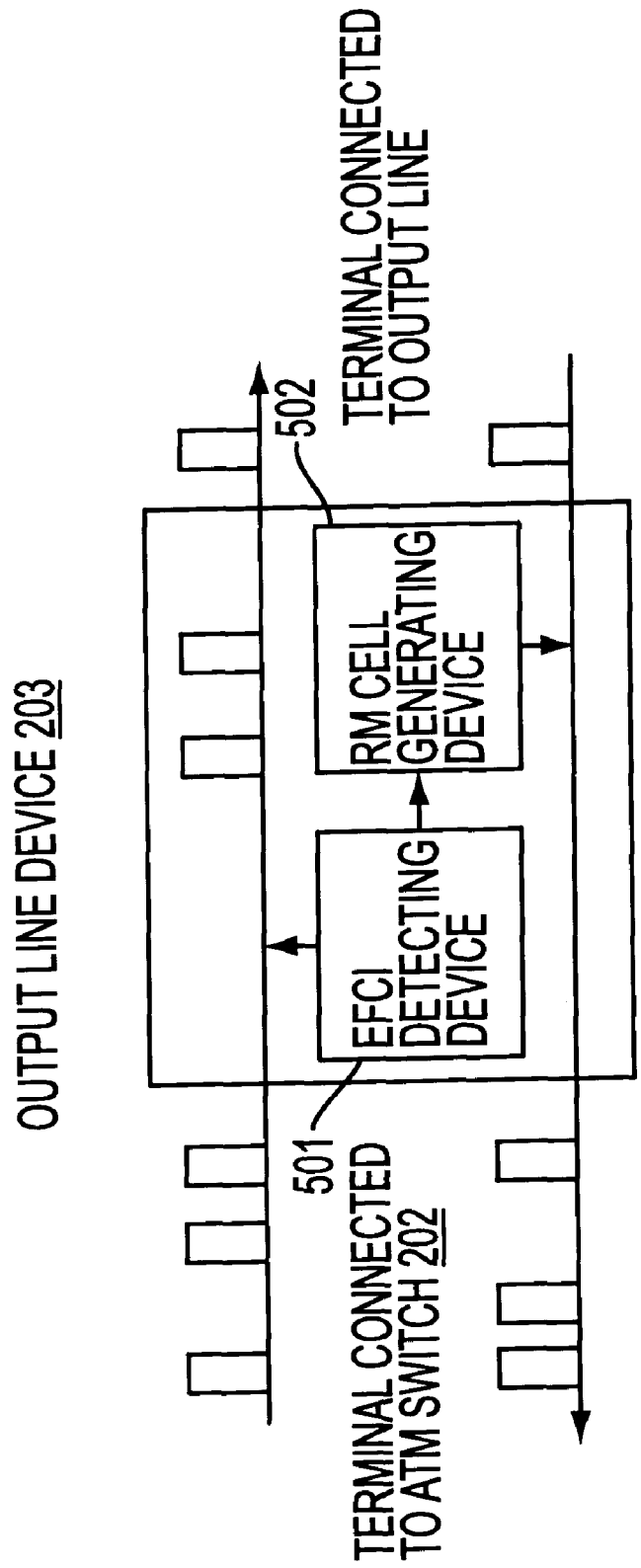
FIG. 5 shows the configuration (1) of the output line device 203.

FIG. 5 shows the configuration of the output line device 203 shown in FIG. 2 according to the first embodiment of the present invention.

The EFCI detecting device 501 checks the PT field of each cell input from the ATM switch 202 to detect a cell in which the EFCI is set, and notifies the RM cell generating device 502 of the VPI/VCI stored in the header field of the cell.

The RM cell generating device 502 generates an RM cell (refer to FIG. 3C) in which the header field stores the same VPI/VCI as the header field of the cell which is received from the EFCI detecting device 501, in which the PT field in the header field has the value of 110 (refer to FIG. 3C) indicating a resource management (RM) cell; and in which the backward congestion indication is set in the payload. Then, the RM cell generating device 502 transmits the RM cell to the ATM switch 202.

The RM cell generating device 502 can perform processes on a plurality of VPIs/VCIs notified by the EFCI detecting device 501.

Described below is the second embodiment of the present invention.

Figure 6:
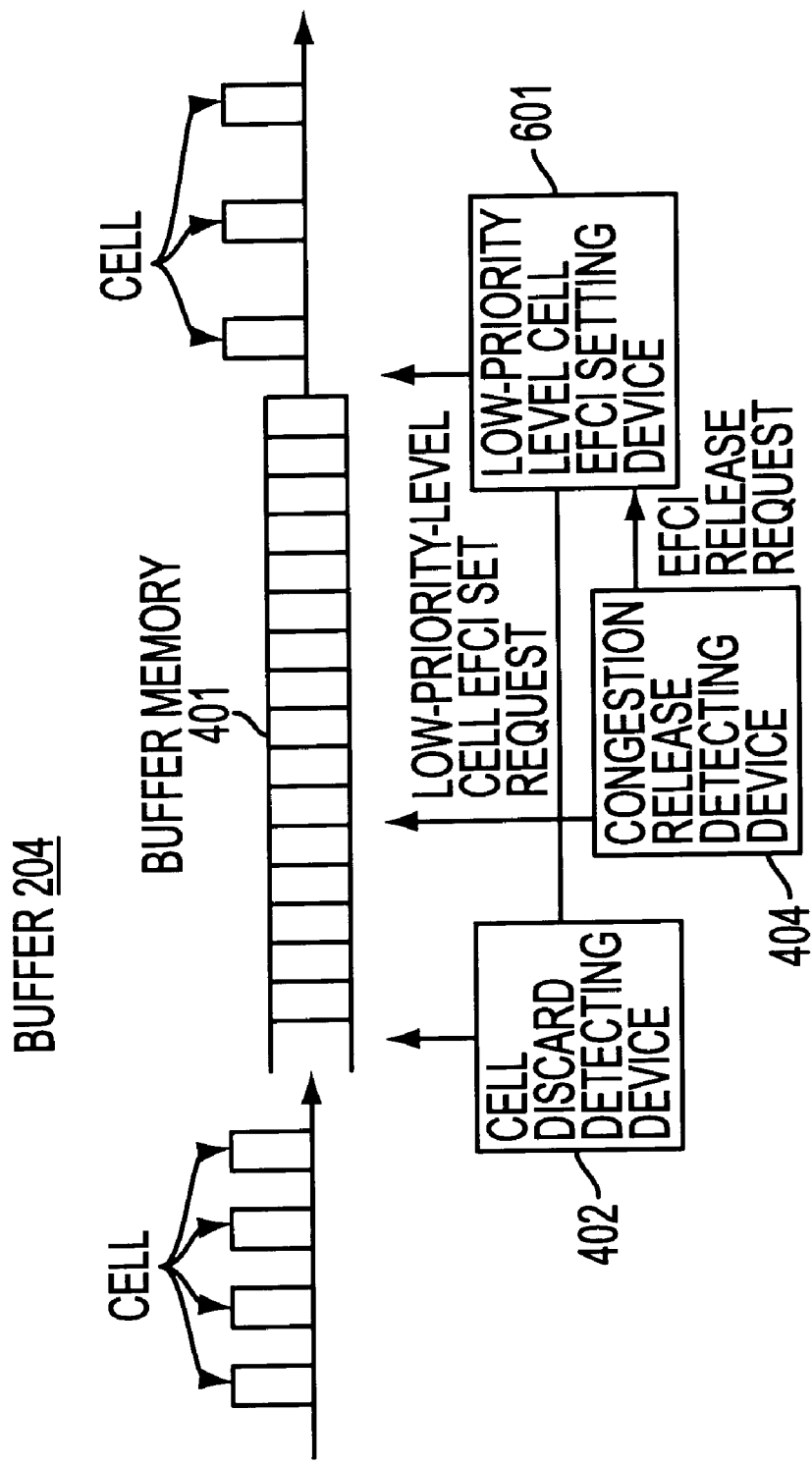
FIG. 6 shows the configuration (2) of the buffer 204.

FIG. 6 shows the configuration of the buffer 204 shown in FIG. 2 according to the second embodiment of the present invention.

In FIG. 6, the portion assigned the same number as that in FIG. 4 has the same function. The cell discard detecting device 402 outputs a low priority level cell EFCI set request to the low-priority-level-cell EFCI setting device 601 at the time the device 402 detects the timing that cells start being discarded. The low-priority-level-cell EFCI set request is essentially the same as the EFCI set request shown in FIG. 4.

When the low-priority-level-cell EFCI setting device 601 receives a low-priority-level cell EFCI set request, it sets an EFCI in the PT field of its header in a low-priority-level cell only. The subscriber can set a cell output from a terminal unit irrespective of whether it is to be prioritized (defined as a high-priority-level cell) or not (defined as a low-priority-level cell). If the cell is defined as a low-priority-level cell, the CLP (cell loss priority level) field (refer to FIG. 3A) in its header is set to 1. If the cell is defined as a high-priority-level cell, the CLP field (refer to FIG. 3A) in its header is set to 0. Therefore, when the low-priority-level-cell EFCI setting device 601 receives a low-priority-level cell EFCI set request, it sets an EFCI in the PT field of the header of the cell output from the buffer memory 401 in which the CLP field is set to 1.

When the low-priority-level-cell EFCI setting device 601 receives an EFCI release request from the congestion release detecting device 404, it stops setting the EFCI in a low-priority-level cell output form the buffer memory 401.

The configuration and function of the output line device 203 shown in FIG. 2 according to the second embodiment of the present invention are the same as those shown in FIG. 5 according to the first embodiment.

Described below is the third embodiment of the present invention.

Figure 7:
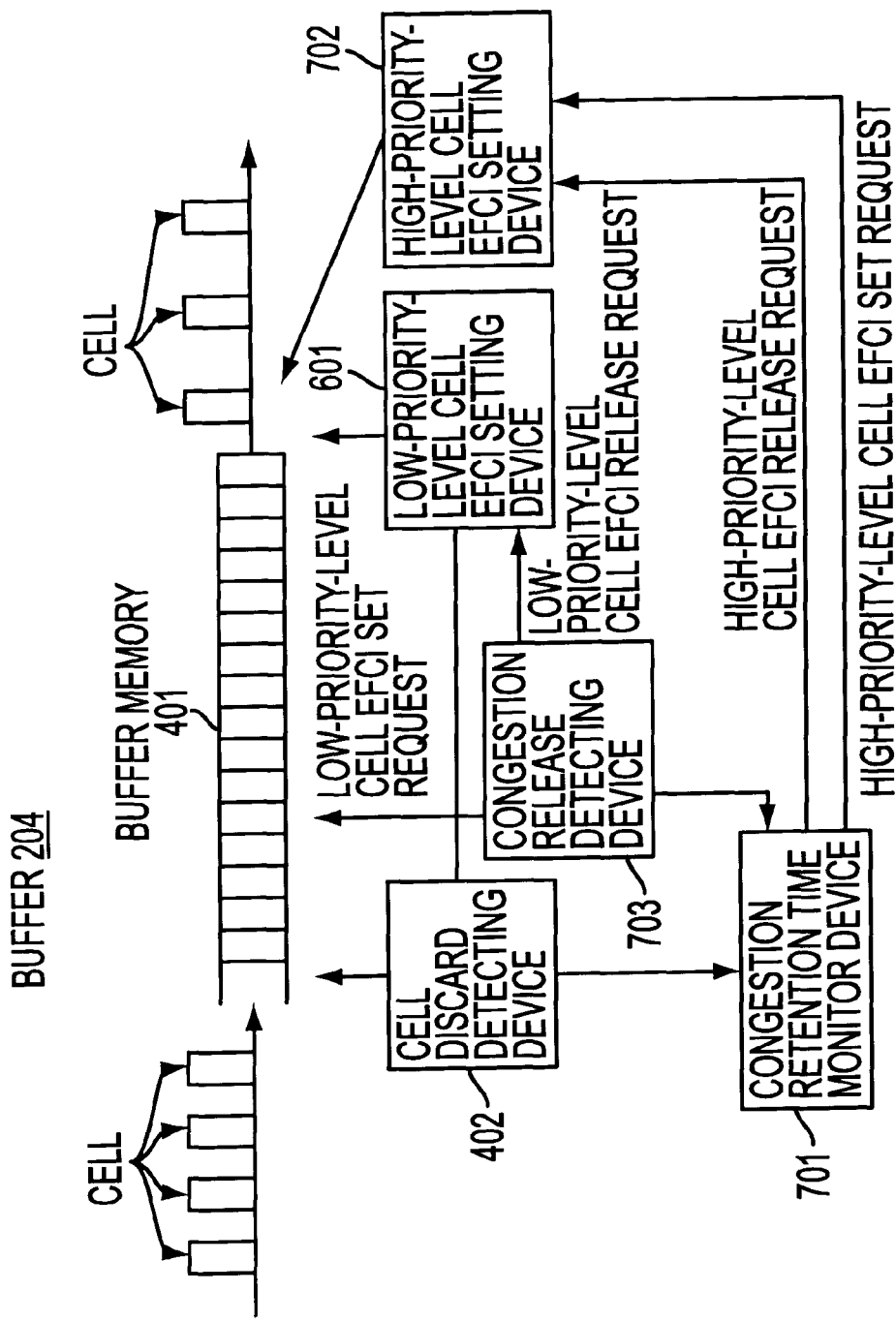
FIG. 7 shows the configuration (3) of the buffer 204.

First, FIG. 7 shows the configuration of the buffer 204 shown in FIG. 2 according to the third embodiment of the present invention.

In FIG. 7 the portion assigned the same number as that in FIGS. 4 and 6 has the same function. According to the present embodiment, if a predetermined time has passed after the system starts setting the EFCI for a low-priority-level cell, the system also starts setting the EFCI for a high-priority-level cell.

The congestion retention time monitor device 701 monitors the amount of time that has elapsed from the point when the cell discard detecting device 402 outputs a low-priority-level cell EFCI set request (when the occurrence of the congestion is detected). If the elapsed time has exceeded a predetermined threshold, the congestion retention time monitor device 701 outputs a high-priority-level cell EFCI set request to the high-priority-level cell EFCI setting device 702.

When the high-priority-level cell EFCI setting device 702 receives a high-priority-level cell EFCI set request, it sets an EFCI in the PT field of the header of the high-priority-level cell in which the CLP field is set to 0.

The congestion release detecting device 703 detects a timing of releasing the congestion for low-priority-level cells by comparing the number of cells stored in the buffer memory 401 with a predetermined first threshold, and simultaneously outputs a low-priority-level cell EFCI set request to the low-priority-level-cell EFCI setting device 601.

When the low-priority-level cell EFCI setting device 601 receives a low-priority-level cell EFCI release request, it stops setting the EFCI in a low-priority-level cell output from the buffer memory 401.

The congestion release detecting device 703 detects a trigger point for releasing the congestion of high-priority-level cells by comparing the number of cells stored in the buffer memory 401 with a predetermined second threshold (>first threshold), and notifies the congestion retention time monitor device 701 of the trigger point. Then, the congestion retention time monitor device 701 monitors the elapsed time from the point. If the elapsed time has exceeded a predetermined threshold, the congestion retention time monitor device 701 outputs a high-priority-level cell EFCI release request to the high-priority-level cell EFCI setting device 702.

When the high-priority-level-cell EFCI setting device 702 receives a high-priority-level cell EFCI release request, it stops setting the EFCI in a high-priority-level cell output from the buffer memory 401.

The configuration and function of the output line device 203 shown in FIG. 2 according to the third embodiment of the present invention are the same as those shown in FIG. 5 according to the first embodiment.

Described below is the fourth embodiment of the present invention.

The configuration and function of the buffer 204 shown in FIG. 2 according to the fourth embodiment of the present invention may be the same as those shown in FIGS. 4, 6 and 7 according to the second and third embodiment.

Figure 8:
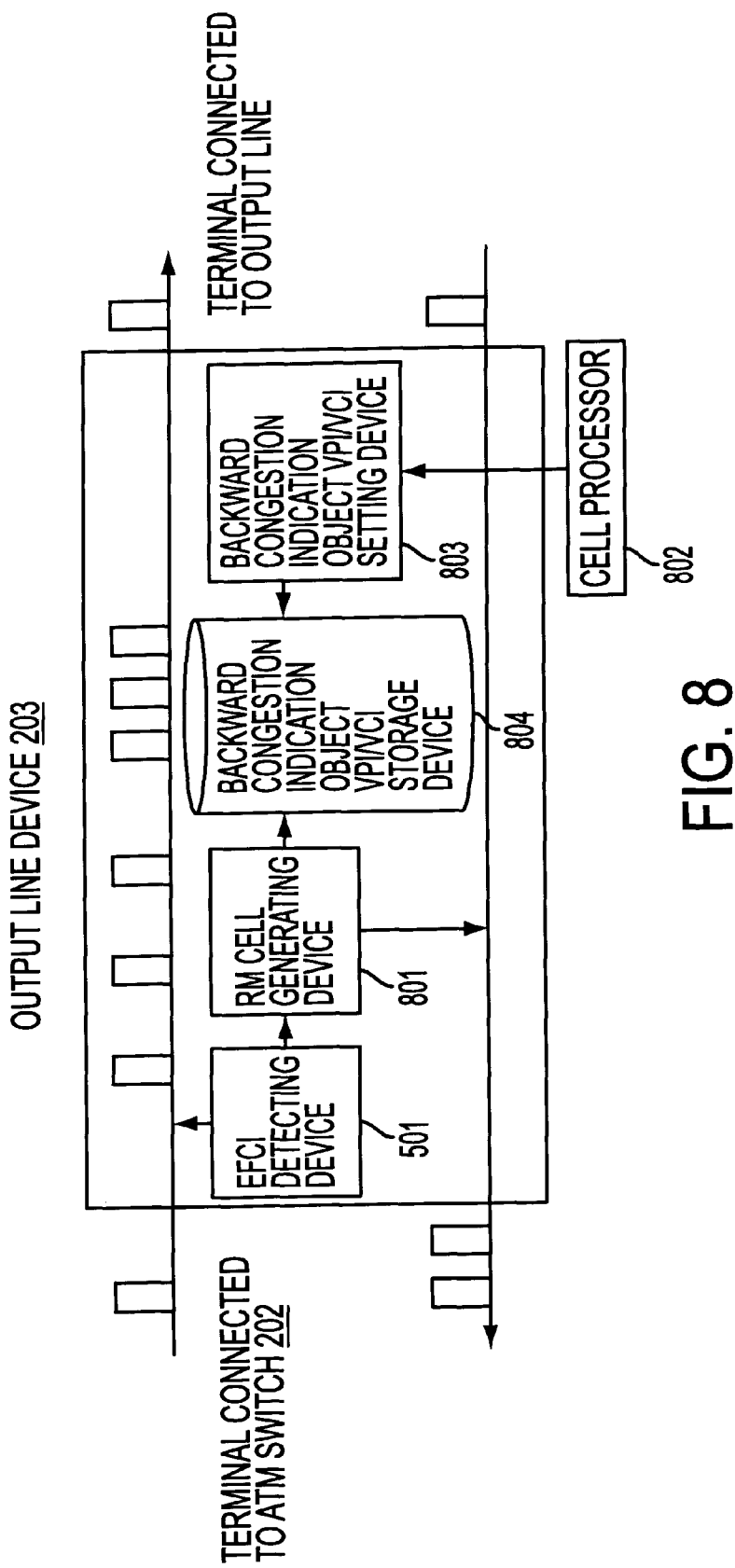
FIG. 8 shows the configuration (2) of the output line device 203.

FIG. 8 shows the configuration of the output line device 203 shown in FIG. 2 according to the fourth embodiment of the present invention.

In FIG. 8, the EFCI detecting device 501 is the same as that shown in FIG. 5 according to the first embodiment of the present invention.

When the subscriber issues a request to set a call, the call processor 802 performs a call setting process and notifies the backward congestion indication object VPI/VCI setting device 803 of the VPI/VCI corresponding to the set call and the request band set by the subscriber.

The backward congestion indication object VPI/VCI setting device 803 writes the pair of VPI/VCI informed by the call processor 802 to the backward congestion indication object VPI/VCI storage device 804.

Then, the RM cell generating device 801 generates RM cells having headers which store VPIs/VCIs, informed of by the EFCI detecting device 501 and stored in the backward congestion indication object VPI/VCI storage device 804, of a predetermined number in order from largest in request band, having the value 110 set in the PT fields of their header to indicate RM cells, and having a backward congestion indication in their payload fields. Then, the RM cell generating device 801 transmits the cells to the ATM switch 202.

Described below is fifth embodiment of the present invention.

The configuration and function of the buffer 204 shown in FIG. 2 according to the fifth embodiment of the present invention may be the same as those shown in FIGS. 4, 6 and 7 according to the second and third embodiment.

The configuration of the output line device 203 shown in FIG. 2 according to the fifth embodiment of the present invention is the same as that shown in FIG. 8 according to the fourth embodiment of the present invention.

According to the fifth embodiment, the backward congestion indication object VPI/VCI setting device 803 rearranges the cells in the descending order request of the band width before writing in the backward congestion indication object VPI/VCI storage device 804, and writes to the backward congestion indication object VPI/VCI storage device 804 only the VPIs/VCIs of a predetermined number having the corresponding request band s in the descending order of the request band width informed by the call processor 802.

Then, the RM cell generating device 801 generates RM cells having headers which store VPIs/VCIs informed by the EFCI detecting device 501 and stored in the backward congestion indication object VPI/VCI storage device 804, having the value 110 set in the PT fields of the header to indicate RM cells, and having a backward congestion indication in the payload fields. Then, the RM cell generating device 801 transmits the cells to the ATM switch 202.

Thus, according to the fifth embodiment, the backward congestion indication object VPI/VCI setting device 803 writes to the backward congestion indication object VPI/VCI storage device 804 only the VPIs/VCIs of a predetermined number in the descending order of the request band width with the request bands. As a result, the RM cell generating device 801 can immediately determine the VPI/VCI of the RM cell to be provided with the backward congestion indication.

Described below is the sixth embodiment of the present invention.

The configuration and function of the buffer 204 shown in FIG. 2 according to the sixth embodiment of the present invention is the same as those shown in FIGS. 4, 6 and 7 according to the first, second and third embodiment.

The configuration of the output line device 203 shown in FIG. 2 according to the sixth embodiment of the present invention is the same as that shown in FIG. 8 according to the fourth embodiment of the present invention.

According to the sixth embodiment and as in the fourth embodiment shown in FIG. 8, the backward congestion indication object VPI/VCI setting device 803 writes to the backward congestion indication object VPI/VCI storage device 804 a pair of VPI/VCI and a request band informed by the call processor 802.

Then, the RM cell generating device 801 generates RM cells having headers which store VPIs/VCIs, informed by the EFCI detecting device 501 and stored in the backward congestion indication object VPI/VCI storage device 804, with request bands set to values equal to or larger than a predetermined value (Mbps), having the value 110 (refer to FIG. 3B) set in the PT fields of the header to indicate RM cells, and having a backward congestion indication in the payload fields. Then, the RM cell generating device 801 transmits the cells to the ATM switch 202.

Described below is the seventh embodiment of the present invention.

The configuration and function of the buffer 204 shown in FIG. 2 according to the sixth embodiment of the present invention may be the same as those shown in FIGS. 4, 6 and 7 according to the first, second and third embodiment.

The configuration of the output line device 203 shown in FIG. 2 according to the seventh embodiment of the present invention is the same as that shown in FIG. 8 according to the fourth embodiment of the present invention.

According to the seventh embodiment, the backward congestion indication object VPI/VCI setting device 803 writes to the backward congestion indication object VPI/VCI storage device 804 only the VPIs/VCIs having corresponding request bands equal to or larger than a predetermined value (Mbps) in each pair of VPI/VCI and a request band informed by the call processor 802.

Then, the RM cell generating device 801 generates RM cells having headers which store VPIs/VCIs informed by the EFCI detecting device 501 and stored in the backward congestion indication object VPI/VCI storage device 804, having the value 110 set in the PT fields of the header to indicate RM cells, and having a backward congestion indication in the payload fields. Then, the RM cell generating device 801 transmits the cells to the ATM switch 202.

Thus, according to the seventh embodiment, the backward congestion indication object VPI/VCI setting device 803 writes to the backwards congestion indication object VPI/VCI storage device 804 only the VPIs/VCIs having the corresponding request bands equal to or larger than a predetermined value (Mbps). As a result, the RM cell generating device 801 can immediately determine the VPI/VCI of the RM cell to be provided with the backward congestion indication.

Figure 9:
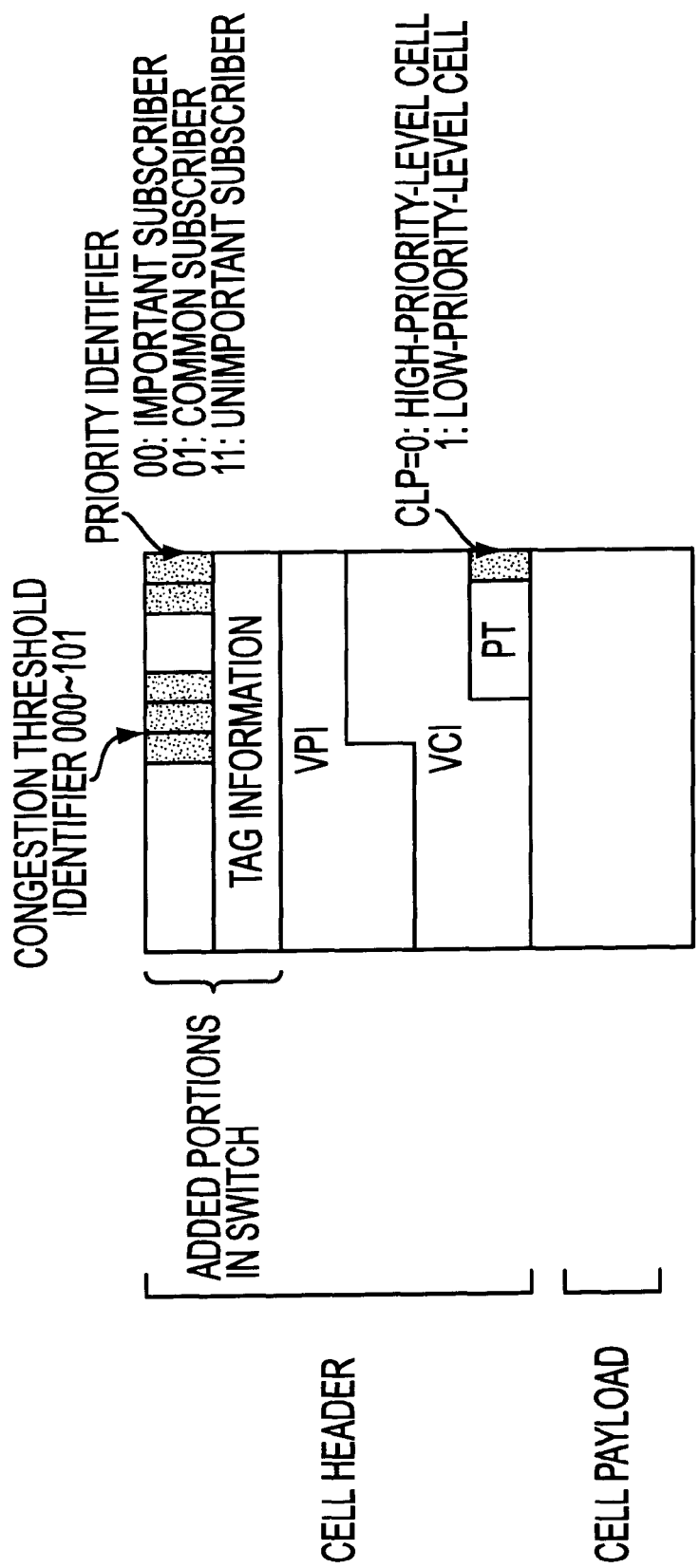
FIG. 9 shows the priority identifier and CLP field.

Described below is the eighth embodiment of the present invention. According to the eighth embodiment, as in the second embodiment, each subscriber can set a cell output from a terminal unit irrespective of whether it is to be prioritized (defined as a high-priority-level cell) or not (defined as a low-priority-level cell). If the cell is defined as a low-priority-level cell, the CLP (cell loss priority level) field in its header is set to 1 as shown in FIG. 9. If the cell is defined as a high-priority-level cell, the CLP field (refer to FIG. 3A in its header is set to 0.

According to the eighth embodiment of the present invention, the ATM switch 202 shown in FIG. 2 can separately process the subscribers as important subscribers, common subscribers, and unimportant subscribers. To perform the process, the VCC conversion/tag assigning device 205 provided at the entry of the ATM switch 202 shown in FIG. 2 sets information referred to as a priority identifier at the head of an input cell in addition to tag information as shown in FIG. 9.

Figure 10:
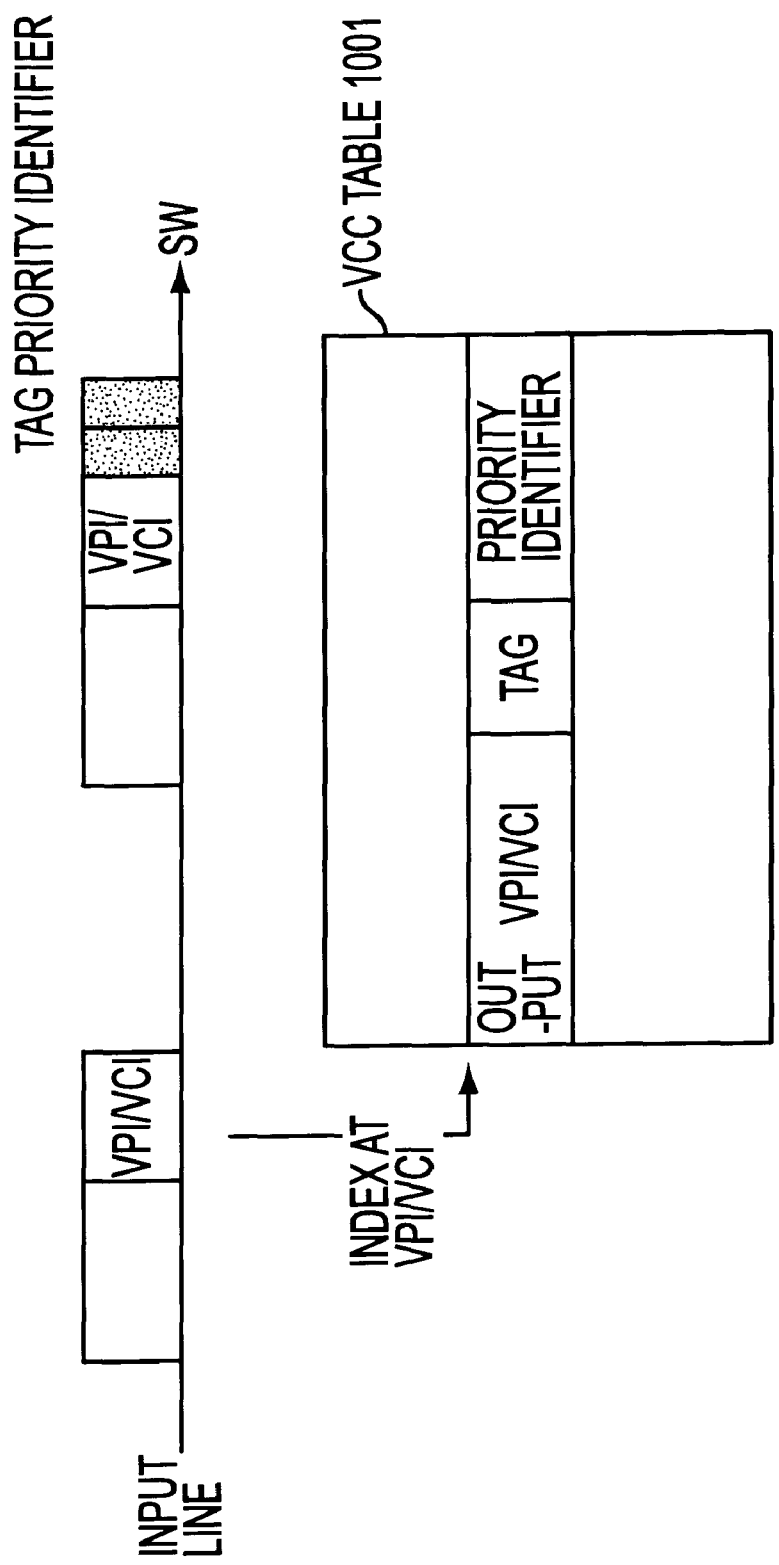
FIG. 10 shows the priority identifier assigning function of the VCC conversion/tag assigning device 205.

The VCC conversion/tag assigning device 205 contains a VCC table 1001 having the internal structure shown in FIG. 10.

When a call is set, the call setting processor, which is not shown in the attached drawings writes to the VCC table 1001, at the address corresponding to the VPI/VCI assigned to the call, in the VCC conversion/tag assigning device 205 corresponding to the line to which the subscriber of the call is connected a value of the output VPI/VCI corresponding to the output line through which the cell of the call is output; tag information for use in autonomously switching the cell of the call in the ATM switch 202; and the priority identifier indicating the priority level of the subscriber that has set the call. The 2-bit value of the priority identifier is 00 for an important subscriber; 01 for a common subscriber; and 11 for an unimportant subscriber. Each subscriber is preliminarily assigned one of the above listed priority levels.

The VCC conversion/tag assigning device 205 refers to the address on the VCC table 1001 corresponding to the VPI/VCI stored in the header of an input cell, reassigns the value of the VPI/VCI as shown in FIG. 9 stored in the header of the input cell to the value of the output VPI/VCI stored at the address on the VCC table 1001, adds the tag information stored at the address on the VCC table 1001 to the head of the input cell as shown in FIG. 9, and sets the priority identifier stored at the address on the VCC table 1001 such that it is higher than the tag information as shown in FIG. 9. The congestion threshold identifier shown in FIG. 9 is set by the buffer 204 shown in FIG. 2 and as described later.

Figure 13:
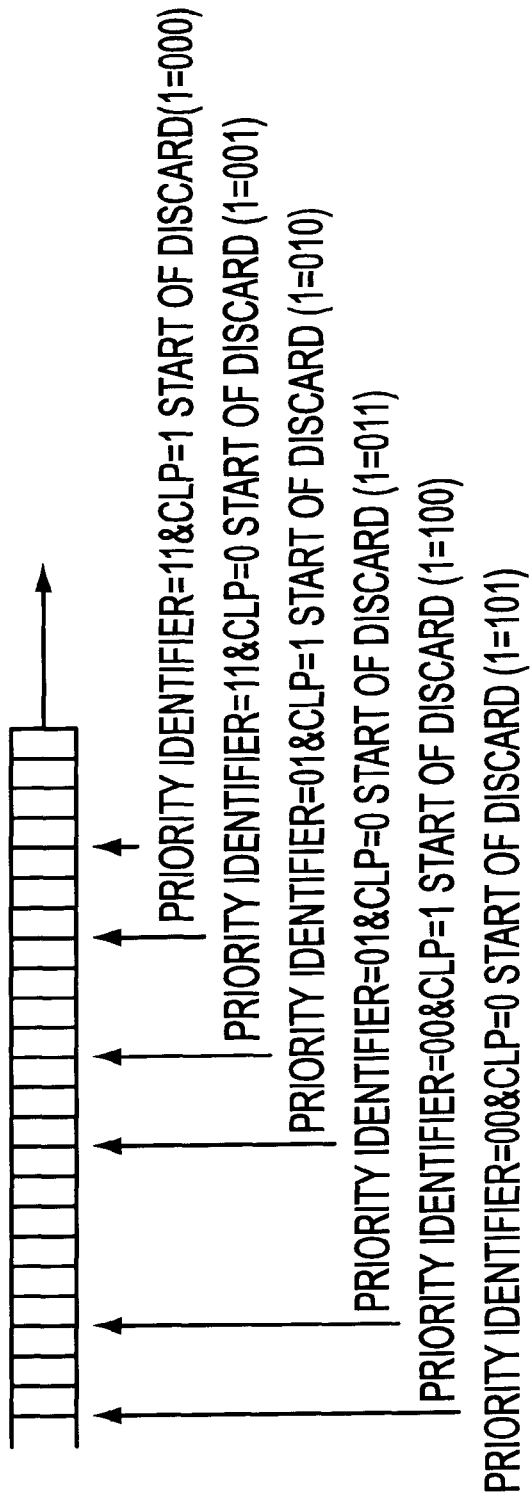
FIG. 13 shows the congestion threshold according to the $8^{th}$ embodiment.

A plurality of congestion thresholds are set in the buffer 204 shown in FIG. 2 corresponding to the priority identifiers and the values in the CLP fields. That is, the congestion threshold is assigned a smaller value for a subscriber who is assigned a lower priority level by the priority identifier as shown in FIG. 13 and referred to later. It is also assigned a smaller value for a lower-priority-level cell for the same priority identifiers of a subscriber relative to the high-priority level cell. As a result, when congestion occurs in the buffer 204, the EFCIs are set in a cell in the descending order of a priority level of the subscriber through the priority identifier, or in the descending order of a priority level of the cell of the same subscriber. Thus, the RM cells are generated after being assigned VPIs/VCIs and a backward congestion indication in order from the VPI/VCI corresponding to the cell in which the EFCI is set as described above.

Figure 11:
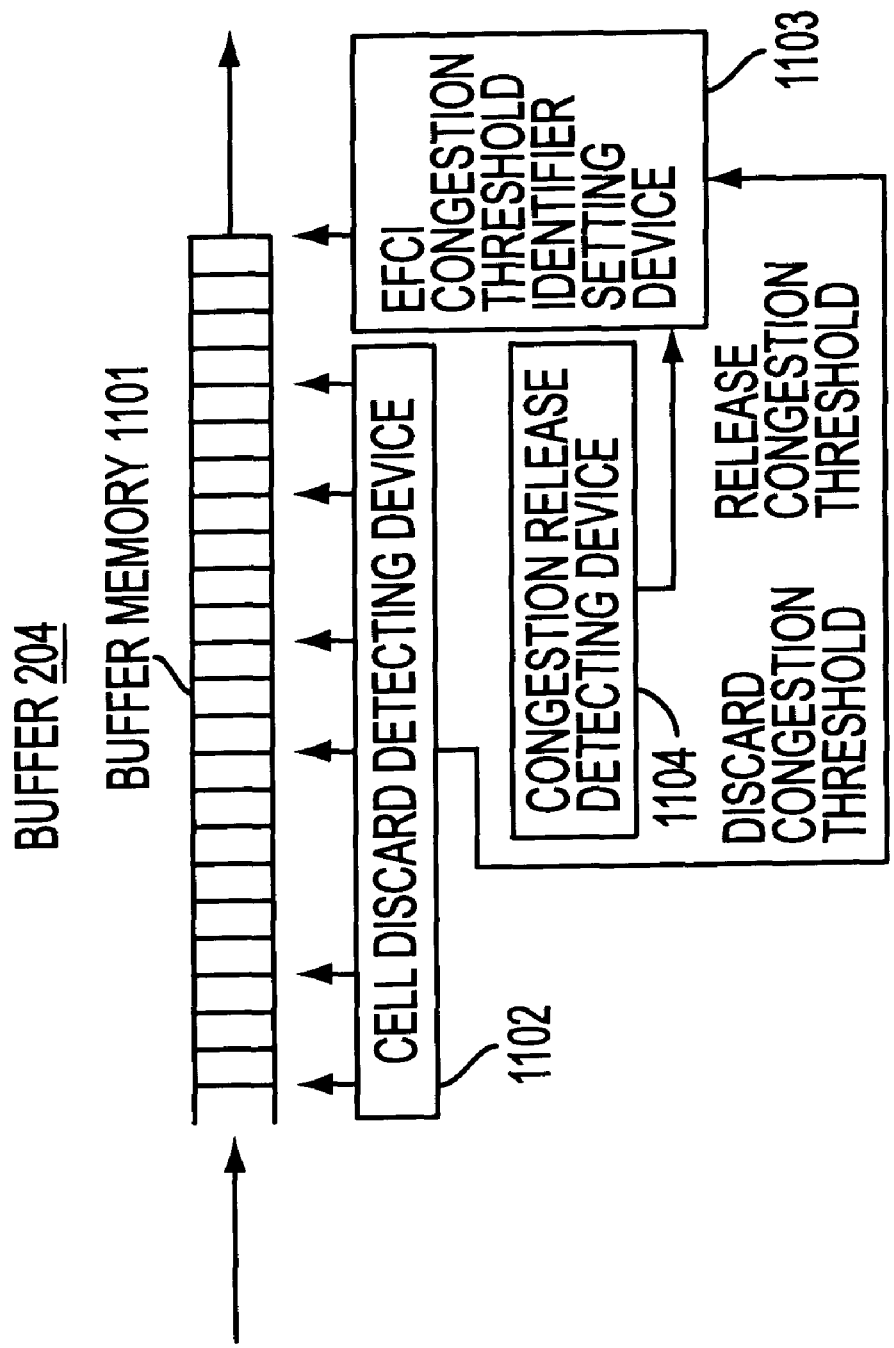
FIG. 11 shows the configuration (4) of the buffer 204.

FIG. 11 shows the configuration of the buffer 204 shown in FIG. 2 according to the eighth embodiment of the present invention.

A buffer memory 1101 temporarily stores cells for use in switching cells.

The cell discard detecting device 1102 outputs to the EFCI/congestion threshold identifier setting device 1103 the congestion threshold (discard congestion threshold) according to which the system has started discarding the cells by comparing the number of cells stored in the buffer memory 1101 with a predetermined threshold as shown in FIG. 13.

When the EFCI/congestion threshold identifier setting device 1103 receives a discard congestion threshold, it sets an EFCI in the PT field in the header of the cell, of the cells output from the buffer memory 1101, in which each value of the priority identifier and each value of the CLP field corresponding to each congestion threshold indicating a value smaller than the input discard congestion threshold are set. As shown in FIG. 9, a congestion threshold identifier is simultaneously set at the head of the cell in addition to the tag information and the priority identifier. The value i of congestion threshold identifier is set corresponding to the values of the priority identifier and CLP field as shown in FIG. 13.

The congestion release detecting device 1104 outputs to the EFCI/congestion threshold identifier setting device 1103 a congestion release threshold according to which the congestion has been released by comparing the number of cells stored in the buffer memory 1101 with each of the release thresholds corresponding to each threshold shown in FIG. 13.

When the EFCI/congestion threshold identifier setting device 1103 receives a congestion release threshold, it stops setting an EFCI and a congestion threshold identifier for a cell, of the cells output from the buffer memory 1101, in which the values of the priority identifier and the CLP field are set corresponding to the input congestion release threshold.

Figure 12:
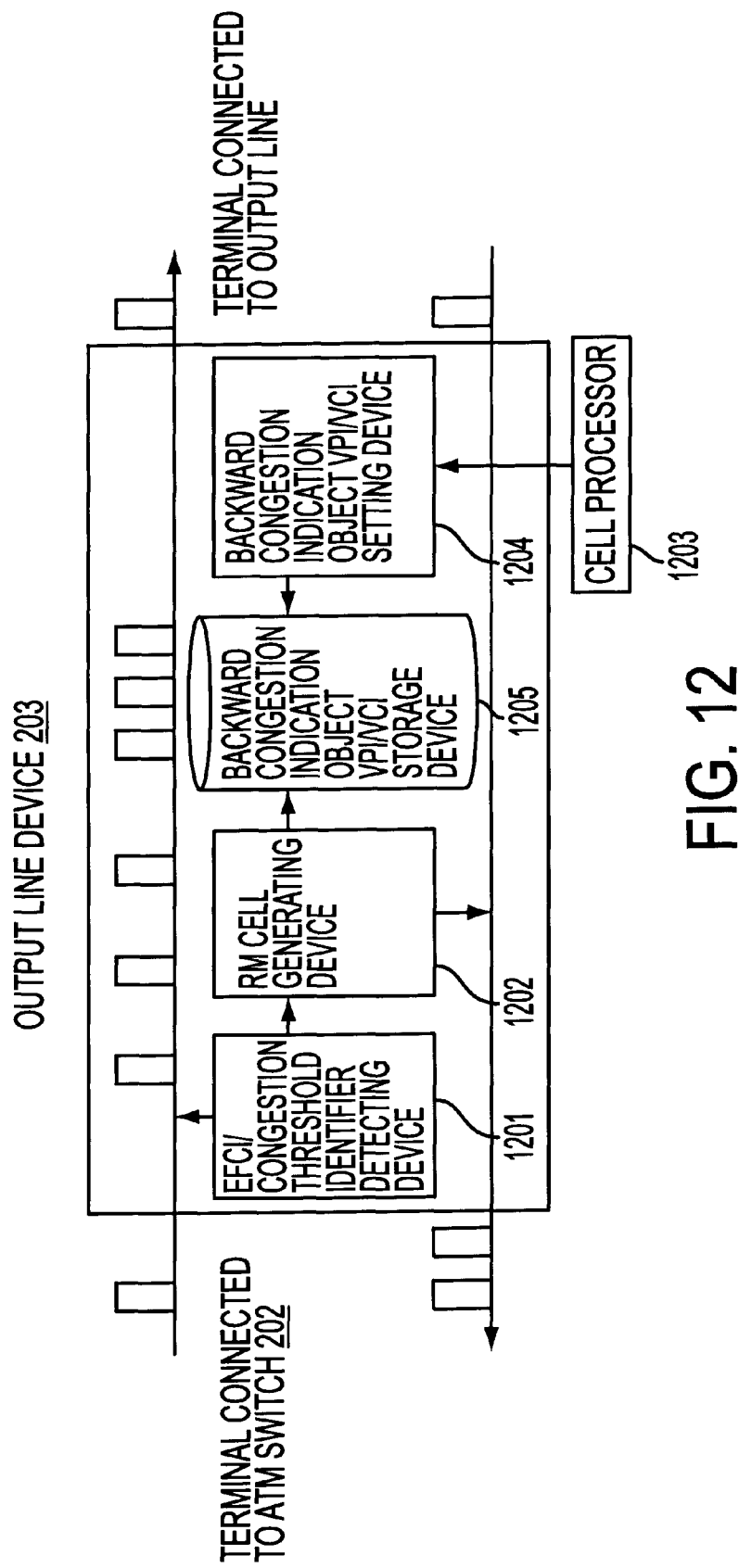
FIG. 12 shows the configuration (3) of the output line device 203.

FIG. 12 shows the configuration of the output line device 203 shown in FIG. 2 according to the eighth embodiment of the present invention.

In FIG. 12, the EFCI/congestion threshold identifier detecting device 1201 detects a cell in which the EFCI is set (refer to FIGS. 3A through 3C) by checking the PT field of each cell input from the terminal connected to the ATM switch 202, detects a congestion threshold identifier set in the cell in which the EFCI is detected (refer to FIG. 9), and notifies the RM cell generating device 1202 of the congestion threshold identifier and the VPI/VCI stored in the header of the cell.

When the subscriber issues a request to set a call, the call processor 1203 performs a call setting process and notifies the backward congestion indication object VPI/VCI setting device 1204 of the VPI/VCI corresponding to the set call, the request band set by the subscriber, and the priority identifier for the subscriber.

The backward congestion indication object VPI/VCI setting device 1204 rearranges the cells in the descending order of a request band width before writing in storage area corresponding to the notified priority identifier in the backward congestion indication object VPI/VCI storage device 1205, and writes to the storage area only pairs of VPI/VCI and a request band of a predetermined number in the descending order of the request band width in each pair of VPI/VCI and a request band informed by the call processor 802.

Otherwise, the backward congestion indication object VPI/VCI setting device 1204 writes to the storage area corresponding to the notified priority identifier in the backward congestion indication object VPI/VCI storage device 804 only the VPIs/VCIs having the corresponding request bands equal to or larger than a predetermined value (Mbps) in each pair of VPI/VCI and a request band informed by the call processor 1203.

The RM cell generating device 1202 determines whether the VPI/VCI notified by the EFCI/congestion threshold identifier detecting device 1201 is contained in the VPIs/VCIs stored in the storage area which is in the backward congestion indication object VPI/VCI storage device 804 and corresponds to the priority identifier belonging to the congestion threshold identifier notified by the EFCI/congestion threshold identifier detecting device 1201. If the determination is YES, the RM cell generating device 1202 generates a cell storing the above described VPI/VCI in its header, storing the value of 110 indicating an RM cell in the PT field of its header, and having a backward congestion indication in the payload field. Then, it transmits the cell to the ATM switch 202. FIG. 14 shows the relationship between the congestion threshold identifier and the priority identifier.

The following configuration can be applied in addition to the above described eighth embodiment. The EFCI/congestion threshold identifier setting device 1103 shown in FIG. 11 in the buffer 204 having the configuration shown in FIG. 2 is designed such that a congestion threshold identifier may not be set in an output cell. As in the first embodiment of the present invention, the output line device 203 shown in FIG. 2 generates a cell which stores the same VPI/VCI as the VPI/VCI for which an EFCI is set in its header, storing the value of 110 indicating an RM cell in the PT field in its header, and having a backward congestion indication in the payload field. Then, it transmits the cell to the ATM switch 202.

Described below is the ninth embodiment of the present invention.

According to the ninth embodiment of the present invention, the configuration and function of the buffer 204 and output line device 203 shown in FIG. 2 can be the same as those in each of the above described embodiments.

The feature of the ninth embodiment resides in the configuration and function of the input line device 201 shown in FIG. 2. According to the ninth embodiment of the present invention, when a cell, in which the PT field in the header stores the value 110 indicating an RN cell and a backward congestion indication is set in the payload field, is received from the ATM switch 202, the input line device 201 restricts the cells input from the input line to the ATM switch 202 by extracting the VPI/VCI stored in the cell and reduces the value of UPC data of the usage parameter control (UPC) in the path corresponding to the VPI/VCI, thereby appropriately avoiding the congestion.

The UPC refers to the control system for monitoring each connection of each user of input lines (for each VPI/VCI) as to whether the band of each connection exceeds the declared band corresponding to the connection. If a connection has a band in excess of the declared band, then the cells transmitted through the connection are discarded. As a result, the band of the connection is controlled so as not to exceed the declared band corresponding to the connection, and congestion is prevented from occurring in the ATM switch 202 and output lines. In this case, the cell discard reference threshold is referred to as UPC data.

Figure 15:
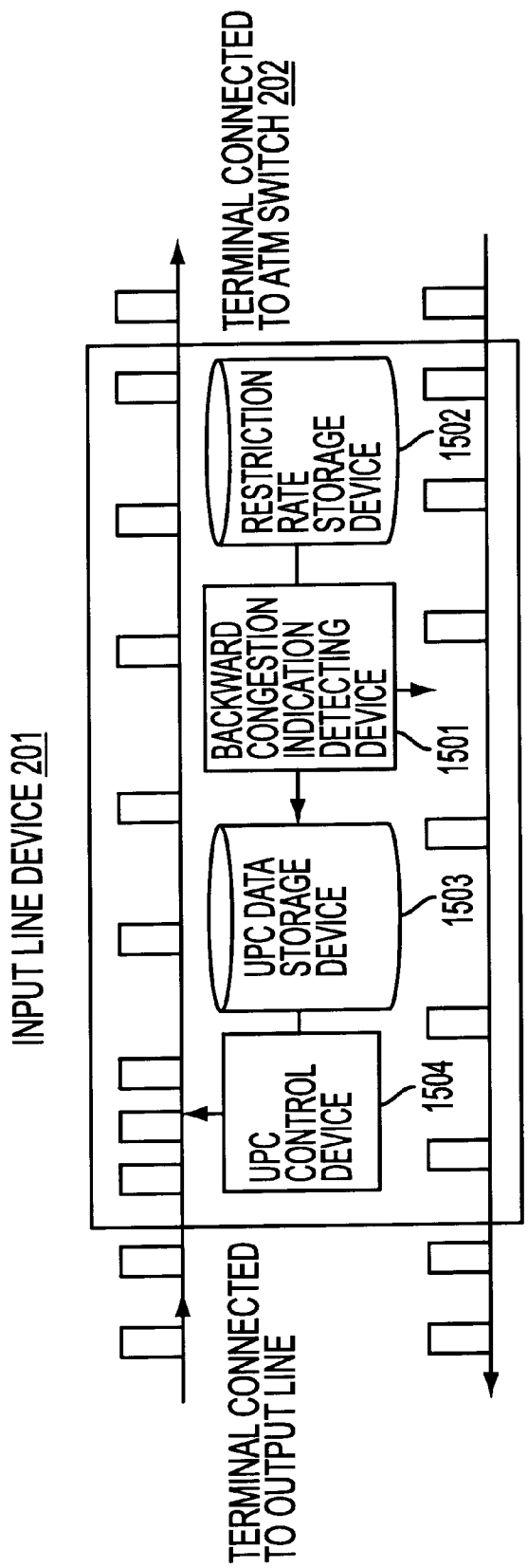
FIG. 15 shows the configuration of the input line device 201 according to the $9^{th}$ embodiment of the present invention.

FIG. 15 shows the configuration of the input line device 201 shown in FIG. 2 according to the ninth embodiment of the present invention.

The restriction rate storage device 1502 stores for each VPI/VCI a value equal to, for example, 10% of the value of the band declared by the user of the VPI/VCI.

The backward congestion indication detecting device 1501 counts the number of cells received from the ATM switch 202 within the unit time $\Delta t$. The cells have PT fields in the header set to 110 indicating an RN cell, and have the backward congestion indication set in the payloads. The backward congestion indication detecting device 1501 reads from the restriction rate storage device 1502 the value equal to 10% of the declared value of the band for the VPI/VCI of cells when the number of cells in the time unit $\Delta t$ has exceeded n, and reduces the value of the UPC data stored in the UPC data storage device 1503 corresponding to the VPI/VCI by 10%.

Figure 16:
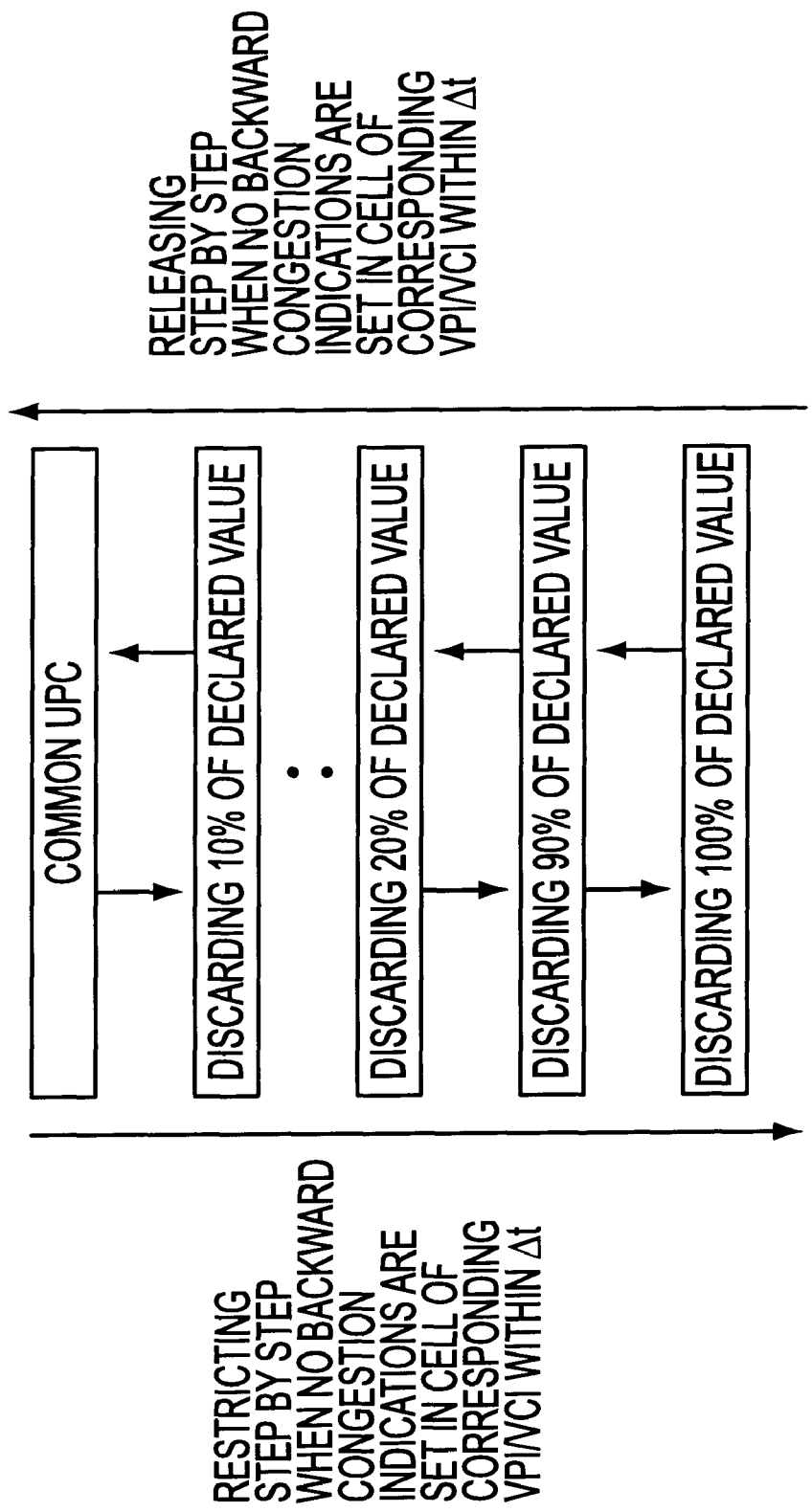
FIG. 16 illustrates the $9^{th}$ embodiment of the present invention.

Subsequently, as shown in FIG. 16 the backward congestion indication detecting device 1501 sequentially reduces the value of the UPC data by 10% of the declared band value for each VPI/VCI each time the number of counted cells per time unit At exceeds n. In reverse, it sequentially releases the value of the UPC data by 10% of the declared band value each time the number of the counted cells per time unit $\Delta t$ is smaller than n.

The UPC control device 1504 controls the UPC data for the cell input through the input line for each VPI/VCI based on the UPC data stored in the UPC data storage device 1503.

Finally the tenth embodiment of the present invention is described.

Figure 17:
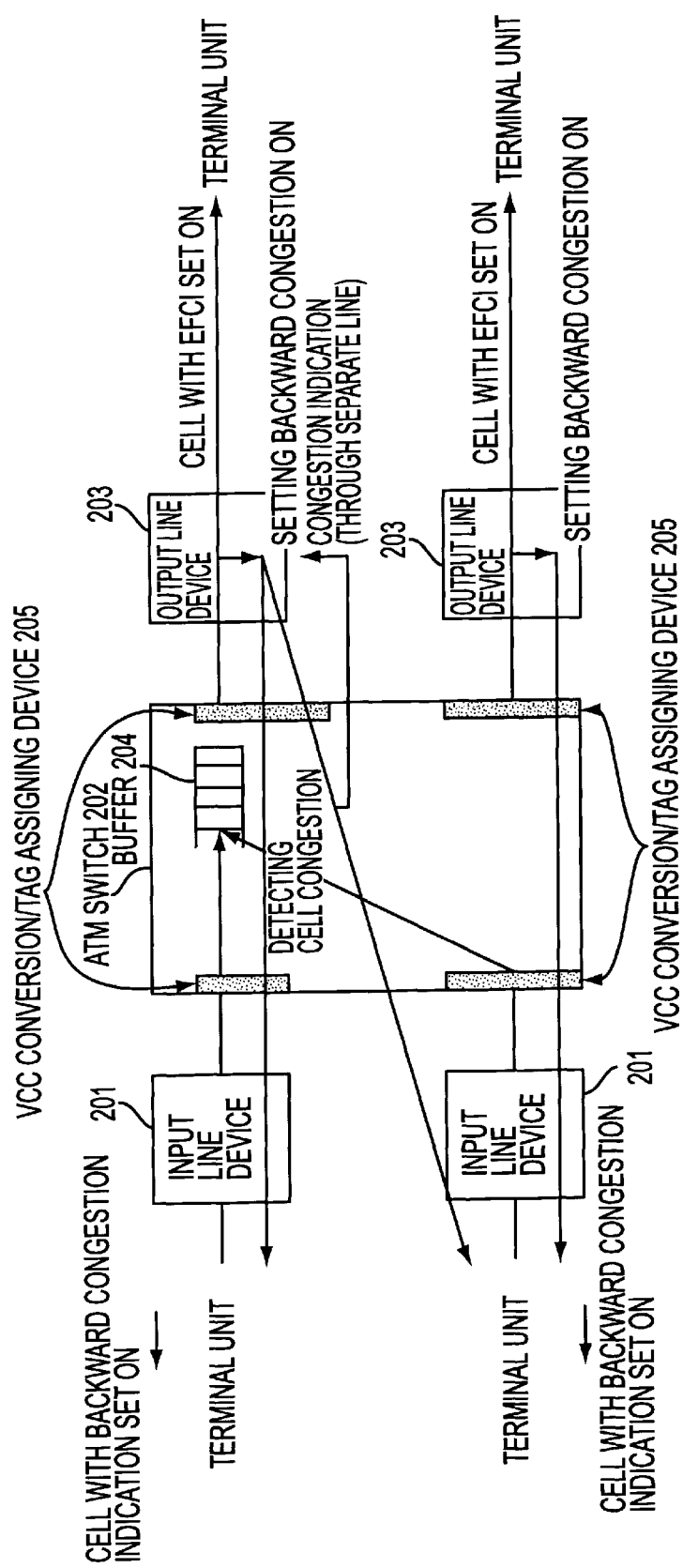
FIG. 17 illustrates the $10^{th}$ embodiment of the present invention.

FIG. 17 shows the tenth embodiment of the present invention.

When the buffer 204 detects the congestion of cells according to the tenth embodiment, the buffer 204 notifies the output line device 203 of the congestion, not by setting the EFCI in the output cell, but by a signal through a dedicated line for notifying of the congestion. In response to the signal, the output line device 203 sets the EFCI in the PT field of the cell output to the output line from the ATM switch 202. The value 110 indicates an RM cell is set in the PT field in the header, a cell is generated and transmitted to the ATM switch 202 with the payload field provided with the backward congestion indication.

In the above described embodiments, the output line device 203 generates an RM cell having a header storing a predetermined VPI/VCI, having the value 110 indicating an RM cell in the PT field of the header, and having the backward congestion indication in the payload, and then transmits it to the ATM switch 202. However, the present invention is not limited to this application, but the output line device, etc. can be designed to detect, from the cells input from the line to the switch device, a cell for which the predetermined VPI/VCI is set, to set a backward congestion indication in a predetermined field in the cell and to transmit the cell to the ATM switch 202.

What is claimed is:

1. A congestion control system for use in a switching system for switching fixed length cells including a header for routing control and data, comprising:

a first congestion detector to detect first congestion information within a cell to be sent to a destination terminal unit identified by a first routing control; and a second congestion information transmitter to transmit to a source terminal unit a cell having a second routing control associated with the first routing control and second congestion information for notifying the source terminal unit of a congestion state, wherein the source terminal that receives the cell is a terminal unit that previously transmitted another cell that caused the congestion state.

2. A congestion control system for use in switching system for switching fixed length cells including a header for routing control and data, comprising:

a first congestion detector to detect first congestion information within a cell to be sent to a destination terminal unit identified by a first routing control, a second congestion information transmitter to transmit to a source terminal unit a cell having a second routing control associated with the first routing control and second congestion information for notifying the source terminal unit of a congestion state, wherein the first congestion information is used for notifying the destination terminal unit of a congestion state; and the first congestion detector detects the first congestion information together with virtual communications line information set in the cell, and the second congestion information transmitter transmits transmit to the source terminal unit the cell in which information identical to the virtual information and the second congestion information indicating the congestion state.

3. A congestion control system for use in a switching system for switching fixed length cells including a header for routing control and data, comprising:

a congestion detector to detect first congestion information which is set in a cell transmitted from a source terminal to a destination terminal and indicates a congestion state of a cell transmission; and a congestion information transmitter to transmit toward the source terminal a second cell in which second congestion information for notifying the source terminal of the congestion state is set, wherein the source terminal that receives the second cell is a terminal unit that caused the congestion state of the cell transmission.

4. The congestion control system according to claim 3, further comprising:

a first congestion setter to set the first congestion information into the cell when the cell is a low-priority cell in which cell loss priority level information indicating that a priority level for a cell loss in a virtual communications line is low is set.

5. The congestion control system according to claim 4 further comprising:

a second congestion setter to set the first congestion information into a high-priority cell in which cell loss priority level information indicating that the priority level for the cell loss in the virtual communications line is high is set.

6. A congestion control system for use in a switching system for switching fixed length cells including a header for routing control and data, comprising:

a congestion detector to detect first congestion information which is set in a cell transmitted from a source terminal to a destination terminal and indicates a congestion state of a cell transmission;

a congestion information transmitter to transmit transmitting means for transmitting toward the source terminal a second cell in which second congestion information for notifying the source terminal of the congestion state is set;

a storage to store virtual communications line information together with corresponding band information;

wherein the congestion detector detects detect virtual communications line information set in the cell; and the congestion information transmitter transmits cells, in which virtual communications line information identical to virtual communications line information detected by said congestion detector and stored in said storage are set, toward source terminals corresponding to the cells, the virtual communications line information set in the cells being information of a predetermined number of pieces in order from largest in band information corresponding to virtual communications line information stored in said storage.

7. A congestion control system for use in a switching system for switching fixed length cells including a header for routing control and data, comprising:

a congestion detector to detects first congestion information which is set in a cell transmitted from a source terminal to a destination terminal and indicates a congestion state of a cell transmission;

a congestion information transmitter to transmit toward the source terminal a second cell in which second congestion information for notifying the source terminal of the congestion state is set;

a storage to store virtual communications line information, together with corresponding band information, of a predetermined number of pieces in order from largest in band indicated by the corresponding band information;

wherein the congestion detector detects virtual communications line information set in the cell; and the congestion information transmitter transmits cells, in which virtual communications line information stored in said storage and identical to virtual communications line information detected by the congestion detector are set, toward source terminals corresponding to the cells.

8. A congestion control system for use in a switching system for switching fixed length cells including a header for routing control and data, comprising:

a congestion detector to detect first congestion information which is set in a cell transmitted from a source terminal to a destination terminal and indicates a congestion state of a cell transmission;

a congestion information transmitter to transmit toward the source terminal a second cell in which second congestion information for notifying the source terminal of the congestion state is set;

a storage to store virtual communications line information together with corresponding band information;

wherein the congestion detector detects virtual communications line information set in the cell; and the congestion information transmitter transmits cells, in which virtual communications line information which is identical to the virtual communications line information detected by the congestion detector, stored in the storage, and having the corresponding band information indicating a band equal to or larger than a predetermined value are set, toward source terminals corresponding to the cells.

9. The congestion control system according to claim 3, further comprising;

a storage to store virtual communications line information having corresponding band information which indicate a band equal to or larger than a predetermined value; wherein the congestion detector detects virtual communications line information set in the cell, and the congestion information transmitter transmits cells, in which virtual communications line information stored in said storage and identical to the virtual communications line information detected by the congestion detector are set, toward source terminals corresponding to the cells.

10. The congestion control system according to claim 3, further comprising:

a congestion state detector to determine congestion state relating to the cell by comparing a congestion threshold and subscriber priority level information which is set in the cell and indicate a priority level of a subscriber who communicate the cell, and a congestion information setter to set the first congestion information into the cell according to the determination by the congestion state detector.

11. The congestion control system according to claim 3, further comprising:

a congestion state detector to determine congestion state relating to the cell by comparing a congestion threshold and cell-loss priority level information which is set in the cell and indicate a priority level for a cell-loss in a virtual communications line of the cell, and a congestion information setter to set the first congestion information into the cell according to the determination by the congestion state detector.

12. The congestion control system according to claim 3, further comprising:

a storage to store, for each of priority levels for cell communications of subscribers, virtual communications line information indicating virtual communications line each corresponding to the subscribers and band information for the virtual communications lines; wherein the congestion detector detects virtual communications line information and priority level of a subscriber set in the cell, and the congestion information transmitter transmits cells, in which virtual communications line information identical to virtual communications line information detected by the congestion detector and stored in regions of the storage which correspond to priority levels detected by the congestion detector are set, toward source terminals corresponding to the cells according to priority levels, the virtual communications line information set in the cells being information of a predetermined number of pieces in order from largest in band information corresponding to virtual communications line information stored in said storage.

13. The congestion control system according to claim 3, further comprising:

a storage to store, for each of priority levels for cell communications of subscribers, virtual communications line information, together with corresponding band information, of a predetermined number of pieces in order from largest in band indicated by the corresponding band information; wherein the congestion detector detects virtual communications line information and priority level of a subscriber set in the cell, and the congestion information transmitter transmits cells, in which virtual communications line information identical to virtual communications line information detected by the congestion detector and stored in regions of said storage which correspond to priority levels detected by the congestion detector are set, toward source terminals corresponding to the cells according to priority levels.

14. The congestion control system according to claim 3, further comprising:

a storage to store for each of priority levels for cell communications of subscribers, virtual communications line information indicating virtual communications lines each corresponding to the subscribers and band information for the virtual communications lines; wherein the congestion detector detects virtual communications line information and priority level of a subscriber set in the cell, and the congestion information transmitter transmits cells, in which virtual communications line information identical to virtual communications line information detected by the congestion detector and stored in regions of the storage which correspond to priority levels detected by the congestion detector are set, toward source terminals corresponding to the cells according to priority levels, the virtual communications line information set in the cells being information having corresponding band information indicating a band equal to or larger than a predetermined value.

15. The congestion control system according to claim 3, further comprising:

a storage to store, for each of priority levels for cell communications of subscribers, virtual communications line information having the corresponding band information indicating a band equal to or larger than a predetermined value; wherein the congestion detector detects virtual communications line information and priority level of a subscriber set in the cell, and the congestion information transmitter transmits cells, in which virtual communications line information identical to virtual communications line information detected by the congestion detector and stored in regions of said storage which correspond to priority levels detected by the congestion detector are set, toward source terminals corresponding to the cells according to priority levels.

16. The congestion control system according to claim 3, further comprising:

a second congestion information detector to receive said second call and detects said second congestion information and virtual communications line information from the second cell; and a controller to control an inflow of cells in a virtual communications line indicated by virtual communications line information detected by the second congestion information detector according to second congestion information detected by the second congestion information detector.

17. The congestion control system according to claim 16, wherein said second congestion information detector detect a number of second cells received in a predetermined unit time; and said controller restricts at a predetermined rate the inflow of the cells in the virtual communications line when said second congestion information detector detects the second cells of a number equal to or larger than a predetermined value in the predetermined unit time.

18. The congestion control system according to claim 17, wherein said controller relaxes at a predetermined rate a restriction on the inflow of the cells in the virtual communications line when said second congestion information detector detects the second cells of a number of smaller than a predetermined value in the predetermined unit time.

19. A congestion control system for use in a switching system for switching fixed length cells including a header for routing control and data, comprising:

a congestion detector to detect congestion in a cell communications line and output first congestion information indicating the congestion; and a congestion information transmitter to detect the first congestion information output by the congestion detector and transmit a cell, in which second congestion information indicating the congestion is set, toward a source terminal of a cell communicated in the cell communications line, where the source terminal that receives the cell is a terminal unit that previously transmitted another cell that caused the congestion in the cell communication line.

20. The congestion control system according to claim 19, further comprising:

a controller to receive a cell having the second congestion information and control a cell inflow of the cell communications line.

21. A congestion control method for use in a switching system for switching fixed length cells including a header for routing control and data, including the steps of:

detecting first congestion information set in a cell to be sent to a destination terminal unit identified by a first routing control; and transmitting to a source terminal unit a cell having a second routing control associated with the first routing control and second congestion information for notifying the source terminal unit of a congestion state, wherein the source terminal that receives the cell is a terminal unit that previously transmitted another cell that caused the congestion state.

22. A congestion control method for use in switching system for switching fixed length cells including a header for routing control and data, including:

a first step of detecting first congestion information which is set in a cell transmitting from a source terminal to a destination terminal and indicates a congestion state of a cell transmission; and a second step of transmitting toward the source terminal a second cell in which second congestion information for notifying the source terminal of the congestion state is set, wherein the source terminal unit that receives the second cell is a terminal unit that caused the congestion state of the cell transmission.

23. The congestion control method according to claim 22, further including a step of:

setting the first congestion information into the cell when the cell is a low-priority cell in which cell loss priority level information indicating that a priority level for a cell loss in a virtual communications line is low is set.

24. The congestion control method according to claim 23 further including a step of:

setting the first congestion information into a high-priority cell in which cell loss priority level information indicating that the priority level for the cell loss in the virtual communications line is high is set.

25. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

storing virtual communications line information together with corresponding band information in a storage; and detecting virtual communications line information set in the cell;

wherein in the second step, cells, in which virtual communications line information identical to the detected virtual communications line information and stored in said storage are set, are transmitted toward source terminals corresponding to the cells, the virtual communications line information set in the cells being information of a predetermined number of pieces in order from largest in band information corresponding to virtual communications line information stored in said storage.

26. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

storing virtual communications line information, together with corresponding band information, of a predetermined number of pieces in order from largest in band indicated by the corresponding band information in a storage; and detecting virtual communications line information set in the cell;

wherein in the second step, cells, in which virtual communications line information stored in said storage and identical to the detected virtual communications line information are set, are transmitted toward source terminals corresponding to the cells.

27. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

storing virtual communications line information together with corresponding band information in a storage; and detecting virtual communications line information set in the cell;

wherein in the second step, cells, in which virtual communications line information which is identical to the detected virtual communications line information, stored in the storage, and having the corresponding band information indicating a band equal to or larger than a predetermined value are set, are transmitted toward source terminals corresponding to the cells.

28. A congestion control method for use in switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

storing virtual communications line information having corresponding band information which indicate a band equal to or larger than a predetermined value in a storage; and detecting virtual communications line information set in the cell;

wherein in the second step, cells, in which virtual communications line information stored in said storage and identical to the detected virtual communications line information are set, are transmitted toward source terminals corresponding to the cells.

29. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

a third step of determining congestion state relating to the cell by comparing a congestion threshold and subscriber priority level information which is set in the cell and indicate a priority level of a subscriber who communicate the cell; and a fourth step of setting the first congestion information into the cell according to the determination in the third step.

30. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

a third step of determining congestion state relating to the cell by comparing a congestion threshold and cell-loss priority level information which is set in the cell and indicate a priority level for a cell-loss in a virtual communications line of the cell; and a fourth step of setting the first congestion information into the cell according to the determination in the third step.

31. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

storing, for each of priority levels for cell communications of subscribers, virtual communications line information indicating virtual communications lines each corresponding to the subscribers and band information for the virtual communications lines in a storage; and detecting virtual communications line information and priority level of a subscriber set in the cell;

wherein in the second step, cells, in which virtual communications line information identical to the detected virtual communications line information and stored in regions of the storing means which correspond to the detected priority levels are set, are transmitted toward source terminals corresponding to the cells according to priority levels, the virtual communications line information set in the cells being information of a predetermined number of pieces in order from largest in band information corresponding to virtual communications line information stored in said storage.

32. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

storing, for each of priority levels for cell communications of subscribers, virtual communications line information, together with corresponding band information, of a predetermined number of pieces in order from largest in band indicated by the corresponding band information in a storage; and detecting virtual communications line information and priority level of a subscriber set in the cell;

wherein in the second step, cells, in which virtual communications line information identical to the detected virtual communications line information and stored in regions of said storing means which correspond to the detected priority levels are set, are transmitted toward source terminals corresponding to the cells according to priority levels.

33. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

storing, for each of priority levels for cell communications of subscribers, virtual communications line information indicating virtual communications lines each corresponding to the subscribers and band information for the virtual communications lines in a storage; and detecting virtual communications line information and priority level of a subscriber set in the cell;

wherein in the second step, cells, in which virtual communications line information identical to the detected virtual communications line information and stored in regions of the storage which correspond to the detected priority levels are set, are transmitted toward source terminals corresponding to the cells according to priority levels, the virtual communications line information set in the cells being information having corresponding band information indicating a band equal to or larger than a predetermined value.

34. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

storing, for each of priority levels for cell communications of subscribers, virtual communications line information having the corresponding band information indicating a band equal to or larger than a predetermined value in a storage; and detecting virtual communications line information and priority level of a subscriber set in the cell;

wherein in the second step, cells, in which virtual communications line information identical to the detected virtual communications line information and stored in regions of said storage which correspond to the detected priority levels are set, are transmitted toward source terminals corresponding to the cells according to priority levels.

35. A congestion control method for use in a switching system for switching fixed length cells including a header for routing control and data, including:

a first step of detecting first congestion information which is set in a cell transmitting from a source terminal to a destination terminal and indicates a congestion state of a cell transmission;

a second step of transmitting toward the source terminal a second cell in which second congestion information for notifying the source terminal of the congestion state is set;

a third step of receiving said second cell and detecting said second congestion information and virtual communications line information from the second cell; and a fourth step of controlling an inflow of cells in a virtual communications line indicated by virtual communications line information detected in the third step according to second congestion information detected in the third step.

36. The congestion control method according to claim 35, wherein a number of second cells received in a predetermined unit time are detected in the third step; and in the fourth step, the inflow of the cells in the virtual communications line is restricted at a predetermined rate when the second cells of a number equal to or larger than a predetermined value are detected in the predetermined unit time in the third step.

37. The congestion control method according to claim 36, wherein in the fourth step, a restriction on the inflow of the cells in the virtual communications line is relaxed at a predetermined rate when the second cells of a number smaller than a predetermined value are detected in the predetermined unit time in the third step.

38. A congestion control method for use in switching system for switching fixed length cells including a header for routing control and data, including:

a first step of detecting congestion in a cell communications line and outputting first congestion information indicating the congestion; and a second step of detecting the first congestion information output in the first step and transmitting a cell, in which second congestion information indicating the congestion is set, toward a source terminal of a cell communicated in the cell communications line, wherein the source terminal that receives the cell is a terminal unit that previously transmitted another cell that caused the congestion in the cell communications line.

39. The congestion control method according to claim 38, further including a step of:

receiving a cell having the second congestion information and controlling a cell inflow of the cell communications line.

* * * * *